(12) United States Patent
Dennis et al.

(10) Patent No.: US 12,461,353 B2
(45) Date of Patent: Nov. 4, 2025

(54) RAMAN SPECTROSCOPY APPARATUS AND METHOD

(71) Applicant: Andor Technology Limited, Belfast (GB)

(72) Inventors: Andrew Colm Dennis, Greenisland (GB); Richard Simms, Belfast (GB)

(73) Assignee: Andor Technology Limited, Belfast (GB)

( * ) Notice: Subject to any disclaimer, the term of this patent is extended or adjusted under 35 U.S.C. 154(b) by 0 days.

(21) Appl. No.: 18/350,947

(22) Filed: Jul. 12, 2023

(65) Prior Publication Data

US 2024/0019675 A1   Jan. 18, 2024

(30) Foreign Application Priority Data

Jul. 14, 2022   (GB) ...................................... 2210391

(51) Int. Cl.
*G01J 3/44*   (2006.01)
*G01J 3/02*   (2006.01)
(Continued)

(52) U.S. Cl.
CPC ........ *G02B 21/0032* (2013.01); *G01J 3/0248* (2013.01); *G01J 3/44* (2013.01); *G01N 21/65* (2013.01); *G02B 21/0044* (2013.01)

(58) Field of Classification Search
CPC ............ G02B 21/0032; G02B 21/0044; G02B 21/04; G02B 21/16; G02B 21/36;
(Continued)

(56) References Cited

U.S. PATENT DOCUMENTS

| | | | | | |
|---|---|---|---|---|---|
| 4,662,747 | A | * | 5/1987 | Isaacson | ................ B82Y 35/00 359/368 |
| 6,128,077 | A | * | 10/2000 | Jovin | .................... G01J 3/2823 356/330 |

(Continued)

FOREIGN PATENT DOCUMENTS

| EP | 2720074 A2 | 4/2014 |
|---|---|---|
| EP | 3982092 A1 | 4/2022 |

(Continued)

OTHER PUBLICATIONS

Search Report pertaining to corresponding European Patent Application No. 23185102, issued Nov. 30, 2023.
(Continued)

*Primary Examiner* — Abdullahi Nur
(74) *Attorney, Agent, or Firm* — GRUMBLES LAW PLLC

(57) ABSTRACT

A Raman spectroscopy apparatus comprises an imaging optical system that transmits light from an object to a spectrograph along an optical path. A scanning device intersects, and is movable with respect to, the optical path. Light is directed onto the scanning device to illuminate the object at a plurality of illumination points. The imaging optical system transmits Raman scattered light emitted from the object at the illumination points to an intermediate image plane, the scanning device being located at the intermediate image plane, and transmits the Raman scattered light from the intermediate image plane to the spectrograph. In comparison with conventional confocal Raman spectroscopy, the apparatus can perform Raman analysis of a sample more quickly, and in comparison with conventional line scan Raman spectroscopy the apparatus can perform Raman analysis more accurately.

20 Claims, 11 Drawing Sheets

(51) Int. Cl.
*G01N 21/65* (2006.01)
*G02B 21/00* (2006.01)

(58) Field of Classification Search
CPC ...... G02B 26/0816; G01J 3/44; G01J 3/0229; G01J 3/06; G01J 3/18; G01N 21/65; G01N 21/01
USPC .......................................................... 356/301
See application file for complete search history.

(56) References Cited

U.S. PATENT DOCUMENTS

| | | | |
|---|---|---|---|
| 2007/0206185 A1* | 9/2007 | Tuschel | G01J 3/2823 |
| | | | 356/301 |
| 2007/0216999 A1 | 9/2007 | Tanibata et al. | |
| 2014/0104681 A1 | 4/2014 | Berman | |
| 2015/0293336 A1 | 10/2015 | Cohen et al. | |
| 2016/0161728 A1* | 6/2016 | Sangu | G02B 27/58 |
| | | | 359/203.1 |
| 2017/0363848 A1* | 12/2017 | Tsuboi | G02B 21/008 |

FOREIGN PATENT DOCUMENTS

| | | |
|---|---|---|
| GB | 2435562 A | 8/2007 |
| GB | 2599651 A | 4/2022 |
| WO | 2014070912 A1 | 5/2014 |

OTHER PUBLICATIONS

Examination/Search Report pertaining to United Kingdom Patent Application No. GB2210391.5, mailed Dec. 19, 2022.

* cited by examiner

RAMAN SPECTROSCOPY APPARATUS AND METHOD

FIELD OF THE INVENTION

This invention relates to Raman spectroscopy. The invention relates particularly to confocal Raman spectroscopy.

BACKGROUND TO THE INVENTION

Confocal Raman spectroscopy using a laser and confocal microscope is known. It involves directing the laser light through a single pinhole to illuminate a sample with a single laser point, and collecting the resultant Raman scattered light from the sample via the same pinhole or another pinhole. The collected Raman light is sent to a spectrometer which performs single point Raman spectrum acquisition. If a Raman image is required, the sample is conventionally moved with respect to the static laser point using a motorised XY or XYZ stage. Alternatively, the laser may be scanned with respect to the sample. In any event, the image is constructed from the Raman spectra that are obtained individually from a respective sample point, the sample points being illuminated one at a time. The spectrum obtained for each point provides image data representing a single respective pixel of the resulting multi-spectral Raman image. However, conventional point scanning Raman confocal spectroscopy is slow. The sample must be raster scanned and a sufficient dwell time is required at each stage position for light collection. The Raman effect is quite weak when compared to other electromagnetic effects, which further contributes to the slow collection of image data. Accordingly multi-spectral Raman images tend to be relatively small because they are slow to acquire.

Non-confocal Raman spectroscopy using widefield, or global, illumination of the sample is also known. However, widefield Raman spectroscopy typically results in blurred images for two main reasons. Firstly, achieving uniform widefield illumination of the sample is very challenging and so laser brightness can vary across the field of view. Secondly, most Raman samples are very scattering. The majority of incident photons undergo elastic scattering and may ricochet several times before undergoing inelastic scattering to become Raman photons. The Raman photons may ricochet around the sample before being collected and detected. This means there is significant scope for a Raman signal for a certain molecular species to be observed from a location where that species is not present. The result of this is blurred images.

Line scan or line illumination Raman spectroscopy is a hybrid form of Raman spectroscopy whereby a sample is illuminated with a line of light and the Raman scatter is directed towards and focused through a slit at the focal plane of a spectrometer used to detect the Raman signal. In this form of Raman microscope the slit acts as a confocal aperture in the axis perpendicular to the spectrograph slit, but there is no confocal aperture in the axis of the slit. This form of Raman spectroscopy cannot be considered to be truly confocal.

It would be desirable to mitigate the problems outlined above.

SUMMARY OF THE INVENTION

From one aspect the invention provides a Raman spectroscopy apparatus, the apparatus comprising:
a spectrograph;
an imaging optical system configured to transmit light from an object along an optical path to the spectrograph;
an irradiation optical system comprising a light source and being configured to illuminate said object by directing light from said light source to the object along at least part of said optical path;
a scanning device comprising a plurality of apertures, the scanning device intersecting said optical path and being movable with respect to the optical path,
wherein said irradiation optical system is configured to direct said light onto said scanning device to illuminate said object at a plurality of illumination points,
and wherein said imaging optical system is configured to transmit Raman scattered light emitted from said object at said illumination points to an intermediate image plane, said scanning device being located at said intermediate image plane, and to transmit said Raman scattered light from said intermediate image plane to said spectrograph.

In comparison with conventional confocal Raman spectroscopy, preferred embodiments of the apparatus can perform Raman analysis of a sample more quickly, and in comparison with conventional line scan Raman spectroscopy preferred embodiments of the apparatus can perform Raman analysis more accurately.

Preferably, said imaging optical system is configured to focus said Raman scattered light to an input focal plane of said spectrograph.

In some embodiments, the apparatus is configured such that said spectrograph receives a linear array of beams, each beam comprising Raman scattered light from a respective one of said illumination points.

Said spectrograph may be configured or configurable to receive a linear array of light beams. Said spectrograph may comprise an entrance aperture shaped to define a slit for receiving said linear array of beams, said entrance aperture preferably being located at the input focal plane of the spectrograph.

In some embodiments, said irradiation optical system is configured so that said plurality of illumination points are arranged in a linear array. Said imaging optical system may be configured to image, or to transmit, light from the linear array of illumination points to said slit.

In some embodiments, said apparatus is configured to take at least one measurement of said scattered Raman light, wherein in each measurement the apparatus detects a plurality of Raman spectra, each Raman spectrum corresponding to a respective one of said illumination points. Said apparatus may be configured to take a plurality of said measurements, wherein in each measurement said Raman spectra correspond to a respective set of illumination points, each set of illumination points corresponding to a different region of said object, each set of illumination points preferably corresponding to a respective linear region of said object. Optionally, said apparatus is configured to scan said object such that said regions collectively cover a target area of said object. Optionally, said apparatus includes scanning means for effecting relative movement between the object and the region of the object in respect of which each measurement is taken.

Typically, said scanning means comprises any one or more of: means for moving said object with respect to said irradiation optical system; a scanning system configured to scan the light from said light source with respect to the object; and/or means for moving an entrance aperture of said spectrograph.

In some embodiments, an optical detector is provided at an exit aperture of the spectrograph, typically at an exit focal plane of the spectrograph.

In preferred embodiments, the apparatus is configured to, or is configurable to, perform Raman spectroscopy and/or Raman imaging, and in a Raman imaging mode, the irradiation optical system is configured to illuminate a target area of said object at a plurality of illumination points, and the imaging optical system is configured to capture at least one Raman image of said target area by detecting Raman scattered light from said illumination points in a selected one or more wavelength range. Said imaging optical system may include a spectral filter configurable to transmit light only in a selected one or more of a plurality of selectable wavelength ranges. In said Raman imaging mode, said spectral filter may be located in the optical path to said spectrograph and is configured to transmit light to said spectrograph in said selected one or more wavelength range. Optionally, said spectral filter is movable into and out of the optical path to said spectrograph, or is configurable to pass light in all of said selectable wavelength ranges simultaneously.

Optionally, in a Raman spectroscopy mode said spectrograph is configured to disperse said Raman scattered light by wavelength, and in said Raman imaging mode said spectrograph is configured not to disperse said Raman scattered light by wavelength, said spectrograph preferably being configured to relay a Raman image from the entrance to the exit of said spectrograph. Said spectrograph may comprise at least one dispersion element, and wherein said at least one dispersion element is movable into and out of a light path between the entrance and exit of the spectrograph, said at least one dispersion element being located in said light path in the Raman spectroscopy mode and out of said light path in the Raman imaging mode, or wherein said at least one dispersion element is configurable between a dispersing state and a non-dispersing state. Optionally, said spectrograph comprises at least one non-dispersion element movable into and out of the light path, wherein in said Raman imaging mode said at least one non-dispersion element replaces said at least one dispersion element in said light path. Optionally, said at least one dispersion element and said at least one non-dispersion element are provided on an assembly that is movable between a dispersion state in which said at least one dispersion element is located in the light path, and a non-dispersion state in which said at least one non-dispersion element is located in the light path.

In some embodiments, the spectral filter is located in the optical path before an optical detector, the imaging optical system including directing means for directing said Raman scattered light to the spectrograph and/or to the optical detector. Typically, the directing means comprises a beam splitter, a mirror or any other suitable optical beam switching or beam directing element(s). Optionally, the directing means is movable with respect to the optical path, or is adjustable, such that, in a Raman spectroscopy mode, at least some of the Raman scattered light is directed to the spectrograph, and in the Raman imaging mode at least some of the Raman scattered light is directed to the optical detector.

In typical embodiments, said scanning device comprises a plurality of lenses aligned with said plurality of apertures to focus said light on said apertures. Preferably, said scanning device comprises a rotatable scanning disk. Preferably, said scanning device includes a rotatable lens disk in which said plurality of lenses are provided, the lens disk being rotatable with the scanning disk.

Typically, said light source is a laser light source and is configured to produce a laser beam.

In some embodiments, the apparatus includes a beam splitter located in the optical path and being transmissive to one of said light source light and said Raman scattered light, and reflective to the other of said light source light and said Raman scattered light, said imaging optical system being configured to image, or to transmit light from, said object along to the optical detector via the beam splitter, and the irradiation optical system being configured to illuminate said object via the beam splitter. Said beam splitter is preferably transmissive to said light source light and reflective to said scattered Raman light. Preferably, the beam splitter is located between the scanning device and the spectrograph.

Preferably, said spectral filter is tuneable, or adjustable, to transmit light only in a selected one or more of a plurality of selectable wavelength ranges.

In preferred embodiments, said irradiation optical system and said imaging optical system are configured to illuminate and image said object confocally.

Preferably, said irradiation optical system includes a laser bandpass filter, preferably located between said light source and said scanning device.

Preferably, said imaging optical system includes a filter, preferably located in said optical path between said scanning device and said optical detector, configured to reject light in a wavelength band corresponding to said light from said light source.

The, or each, optical detector may comprise an electronic image sensor, for example comprising a CCD or EMCCD detector, or any other suitable digital image sensor, and may optionally be incorporated into, or may comprise, a digital camera, and/or wherein said optical detector comprises an optical spectral analyser, for example comprising a spectrometer or spectrograph.

Said spectral filter may comprise any one of: an optical filter configured to pass light in one or more fixed wavelength bands, or a tuneable optical filter, for example a liquid crystal tuneable filter (LCTF); an acousto-optic tuneable filter (AOTF); a plurality of different filters on a filter wheel or other movable carriage; a plurality of wavelength/angle tuneable filters on a pivotable filter wheel; a plurality of broad-bandpass filters used in conjunction with a Fabry Perot etalon; or a subtractive double monochromator.

Said spectral filter, and/or said at least one optical spectral analyser, may be located in the optical path between said scanning device and said optical detector, or wherein said at least one optical spectral analyser serves as said optical detector.

A beam splitter is typically located between the scanning disk and the spectrograph, preferably being located adjacent the scanning disk.

One or more optical polariser may be provided in the irradiation optical system, the or each polariser preferably being located between the light source and the scanning device.

One or more polarisation analyser may be provided in the imaging optical system, the polarisation analyser preferably being located before the spectral filter or spectral analyser.

From another aspect, the invention provides a Raman spectroscopy method comprising:
transmitting light from an object along an optical path to a spectrograph;
illuminating said object by directing light from a light source to the object along at least part of said optical path;
directing said light onto a scanning device to illuminate said object at a plurality of illumination points, wherein said scanning device comprises a plurality of apertures, intersects and is movable with respect to the optical path;

transmitting Raman scattered light emitted from said object at said illumination points to an intermediate image plane, said scanning device being located at said intermediate image plane; and transmitting said Raman scattered light from said intermediate image plane to said spectrograph.

The method may involve taking at least one measurement of said scattered Raman light, wherein in each measurement a plurality of Raman spectra are detected, each Raman spectrum corresponding to a respective one of said illumination points. The method may include taking a plurality of said measurements, wherein in each measurement said Raman spectra correspond to a respective set of illumination points, each set of illumination points corresponding to a different region of said object, each set of illumination points preferably corresponding to a respective linear region of said object. Optionally, the method involves scanning said object such that said regions collectively cover a target area of said object.

The method may involve performing Raman spectroscopy and/or Raman imaging, and in a Raman imaging mode, the method involves illuminating a target area of said object at a plurality of illumination points, and capturing at least one Raman image of said target area by detecting Raman scattered light from said illumination points in a selected one or more wavelength range.

Optionally, in a Raman spectroscopy mode the method involves dispersing said Raman scattered light by wavelength, and in said Raman imaging mode not dispersing said Raman scattered light by wavelength.

Further advantageous aspects of the invention will be apparent to those ordinarily skilled in the art upon review of the following description of specific embodiments and with reference to the accompanying drawings.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

Figure 1:
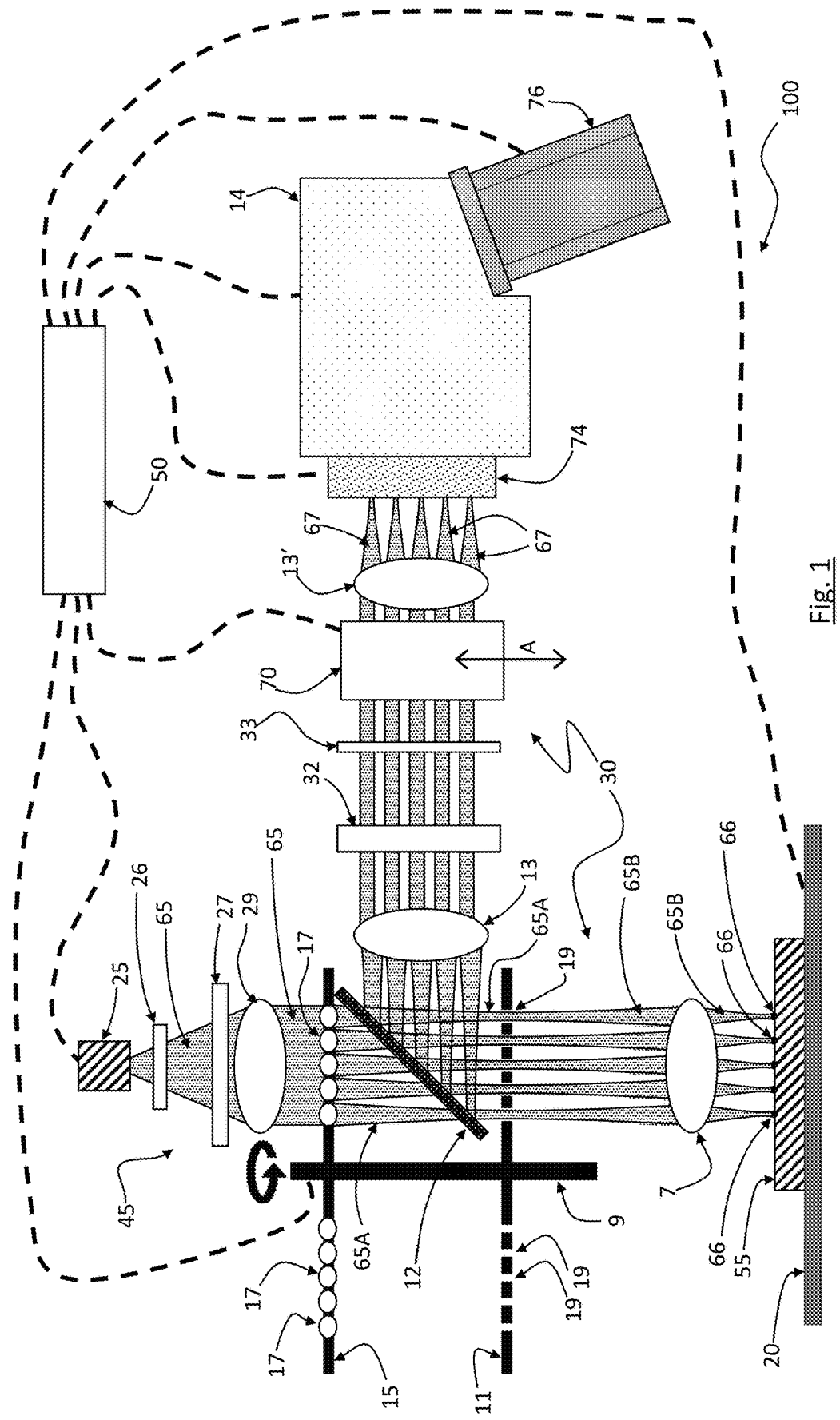
FIG. 1 is a schematic illustration of a scanning disk confocal Raman spectroscopy apparatus embodying one aspect of the present invention.

Referring now to the drawings there is shown, generally indicated as 100, a Raman spectroscopy apparatus embodying one aspect of the invention. The apparatus 100 may comprise an optical microscope, which in preferred embodiments is a spinning disk (or scanning disk) confocal microscope. In preferred embodiments, the apparatus 100 may be referred to as a confocal Raman spectroscopy apparatus. In some embodiments, as described in more detail hereinafter, the apparatus 100 is configurable to capture images of a sample using Raman scattered light and is therefore operable as a Raman imaging apparatus, in particular a confocal Raman imaging apparatus.

The apparatus 100 includes a stage 20 for receiving an object, or sample, 55 to be analysed. The sample 55 usually comprises a specimen, typically a biological, semiconductor, crystalline or chemical specimen, and may be located in or on a slide or other holder (not shown). The object 55 is located in an object plane.

The apparatus 100 includes a spectrograph 14, or optical spectral analyser. The spectrograph 14 typically has an entrance aperture 74 by which light may enter the spectrograph 14, and at least one dispersion element (not shown in FIG. 1), for dispersing, or separating, the received light by wavelength to produce one or more corresponding spectrum. This may be referred to as chromatic dispersion. The dispersed light is directed to a detector 76, typically located at or adjacent an exit aperture 78, which detects the, or each, spectrum. In particular, the detector 76 may be located at an exit focal plane, the spectrograph 14 being configured to focus the dispersed light onto the exit focal plane. Typically, one or more diffraction grating (which may be reflective or transmissive), or one or more prism, or a combination of grating(s) and prism(s) are provided for dispersing the light. The spectrograph 14 typically includes one or more other optical elements, such as mirror(s) and/or lens(es), for focusing, collimating, directing, spreading and/or conditioning the light as required. The spectrograph 14 may be conventional or substantially conventional in configuration, for example having an Echelle configuration, Czerny-Turner configuration or Schmidt Czerny-Turner configuration, as suits the application. In preferred embodiments, the spectrograph 14 is configured to disperse the light in one dimension only, preferably such that the light is dispersed in a single plane.

In preferred embodiments, the detector 76 comprises an electronic image sensor (not shown), for example comprising a CCD or EMCCD detector, or any other suitable digital image sensor, e.g. a InGaAs, CMOS, InSb, Ge or MCD detector depending on the spectral ranges being analysed. The detector 76 may be incorporated into, or may comprise, a digital camera, or other apparatus comprising a digital image sensor. In other embodiments (not illustrated), the detector 76 need not necessarily comprise an image sensor and may alternatively comprise one or more other conventional optical detection device, e.g. one or more single pixel detectors, or a line detector.

The apparatus 100 includes an imaging optical system 30 configured to relay the image at object 55 to the spectrograph 14 along an optical path. The preferred configuration is such that the Raman light from the sample 55 is focused to an input focal plane of the spectrograph 14, which is typically located at the entrance aperture 74. The imaging optical system 30 may be said to image the object, or sample 55, to the spectrograph 14, or to optically transmit or optically relay an image of the object, or sample 55, to the spectrograph.

The imaging optical system 30 comprises a train of optical devices, typically comprising at least one lens and optionally at least one mirror, arranged to direct light from the object 55 to the spectrograph 14. The optical train of the imaging optical system 30 includes an objective lens 7, which may be referred to as an objective. The objective 7 has an optical axis that is typically perpendicular with the object plane. Conveniently the objective 7 is a microscope objective, e.g. a compound microscope objective lens, but a plano convex (PCX), achromatic lens, aspheric lens, Cassegrain lens or other objective lens may be used. The specific composition and configuration of the optical train may vary from embodiment to embodiment as would be apparent to a skilled person, and only those components that are helpful in understanding the invention are illustrated and described herein.

In preferred embodiments, the optical train of the imaging optical system 30 is configured to form an intermediate image of the object 55 at an intermediate image plane. To this end, the imaging optical system 30 typically comprises a tube lens, or other lens(es) (not shown), configured to form, together with the objective 7, the intermediate image. A scanning disk 11 is located in the intermediate image plane, intersecting the optical path. The scanning disk 11 is rotatable and comprises an array of apertures, commonly referred to as pinholes. As such, the scanning disk 11 may be referred to as a spinning disk, or a spinning pinhole disk. Preferably, a second rotatable disk 15 is coupled to the scanning disk 11 for rotation therewith. The disks 11, 15 are typically fixed to a common axle 9 and rotate in unison with the shaft. The second disk 15 comprises an array of lenses, or microlenses, and may be referred to as a spinning lens disk or collector disk. The disks 11, 15 together form a spinning disk assembly, and the arrangement of the disks 11, 15 is such that the lens array and pinhole array are aligned with each other so that light incident on the lenses is focused on the pinholes. The lens disk 15 may be omitted although this results in an inefficient use of the light and may adversely affect the signal to noise ratio of resulting images. Either or both of the disks 11, 15 may be of a type commonly referred to as a Nipkow disk.

The apparatus 100 may include any suitable drive means (not illustrated) for rotating the disk assembly 11, 15 about its central axis (e.g. via axle 9). The drive means typically comprises a motor, usually an electric motor, coupled to an axle of the disk assembly. The disks 11, 15 may spin at any speed that suits the application requirements. For example, in some embodiments the disks 11, 15 may spin at approximately 400 RPM or approximately 20,000 RPM. Typically, the disks 11, 15 spin at any desired speed up to approximately 20,000 RPM.

In alternative embodiments (not illustrated) the scanning disk assembly 11, 15 may be replaced with an alternative scanning device that has a movable structure, which is typically plate-like, with a plurality of apertures, or pinholes, formed in it, preferably coupled to a corresponding, aligned lens structure, and being movable with respect to the optical path in order to point-illuminate the object 55 in the same or similar manner to the disk assembly 11, 15. The scanning device need not necessarily be rotatable, but may alternatively be configured for reciprocating or oscillating movement with respect to the optical path. Any suitable drive means may be provided for this purpose. The pinholes may be arranged in the same or similar manner as described for the disks 11, 15.

The optical train of the imaging optical system 30 typically includes an optical relay comprising at least one relay lens 13, 13' for relaying light from the object 55 to the spectrograph 14. In the illustrated embodiment, the optical relay, which in this example comprises first and second relay lenses 13, 13', is located between the spinning disk assembly 11, 15 and the spectrograph 14. It will be understood that the optical train imaging optical system may include any other suitable arrangement of lenses and, if required, mirror(s) and/or beam splitter(s).

The apparatus 100 includes an irradiation optical system 45 for irradiating the sample 55. The irradiation optical system 45 comprises, or is connectable to, a light source 25, which in preferred embodiments comprises one or more laser devices, but may alternatively comprise any other suitable conventional light source, for example one or more LEDs. The light source 25 may be configured to produce light in one or more frequency bands as suits the application and as would be apparent to a skilled person. For example, suitable wavelengths for Raman spectroscopy and imaging are 488 nm, 532 nm 785 nm, but more generally Raman scatter can be detected using light, preferably laser light, in the UV-Visible-Near IR range of wavelengths, for example in the range 200 nm to 1600 nm.

In preferred embodiments, the irradiation optical system 45 is configured to irradiate the object 55 by directing light, typically in the form of a laser beam 65, to the object 55 along at least part of the optical path defined by the imaging optical system 30.

Optionally, one or more optical polariser 26, for example comprising one or more polarising filter and/or other optical polarising component(s), is provided in the irradiation optical system 45 for polarising the irradiation light 65. Polariser 26 polarises light going to the sample 55. The polariser 26 may be provided in any suitable location in the optical irradiation path. Preferably, the polariser 26 is located between the light source 25 and the scanning disk assembly 11, 15. Using polarised light for Raman experiments may be required if, for example, it is desired to obtain information on the symmetry of molecules being studied.

Optionally, a collimating lens 29 is provided between the light source and the disk assembly in order to collimate the beam 65.

Optionally, one or more optical filters, e.g. a bandpass filter, may be provided to condition the beam 65 to suit the application. In preferred embodiments, a bandpass filter 27 is provided, conveniently between the light source 25 and the disk assembly 11, 15, to ensure that only excitation light 65 in a suitably narrow wavelength band is transmitted to the sample 55. For example, the bandpass filter 27 may be configured to have a passband of between 1 nm and 4 nm around the selected wavelength for the excitation light. Filters of the type sometimes referred to as laser-line clean up filters may be used as filter 27. Without the bandpass filter 27, there is a risk that light from at an unwanted wavelength may be incident on the sample which may cause spectral contamination of the resulting scattered light.

In preferred embodiments, the irradiation optical system 45 is configured to irradiate the object 55 through the objective 7. To facilitate this, a beam splitter 12 may be included in the imaging optical system 30. The beam splitter 12 is configured to be transmissive to light in one or more frequency bands corresponding to the light produced by the light source 25, and to be reflective (or at least partly reflective) to light in one or more wavelength band corresponding to light that is emitted from the object 55 when irradiated, in particular Raman scattered light. In this connection, Raman scattered light is typically between approximately $-1000$ cm-1 to $+4000$ cm-1 relative to the laser wavelength, where negative cm-1 denotes Anti-Stokes scattered light. The beam splitter 12 may be said to have one or more reflection band corresponding to light that is emitted from the object 55, and a transmission band corresponding to the light produced by the light source 25. Typically, the beam splitter 12 comprises a dichroic filter, dichroic mirror or other dichroic optical component. The light source 25 is arranged to direct the laser beam 65 through the beam splitter 12 and onto the optical path whereupon it is directed to the object 55 through the objective 7. The beam splitter 12 is located between the scanning pinhole disk 11 and the spectrograph 14, typically being located adjacent the scanning pinhole disk 11. In preferred embodiments, the beam splitter 12 is located between the scanning disk 11 and the lens disk 15. The beam splitter 12 is arranged to reflect light that is directed along the optical path from the sample 55 and through the scanning disk 11 to the spectrograph 14, via the optical relay 13, 13' in the present example. In alternative embodiments (not illustrated) the beam splitter 12 may be reflective to the laser light and transmissive to the Raman scattered light, and the irradiation optical system 45 and imaging system 30 may be configured accordingly (e.g. with respect to FIG. 1, the positions of the spectrograph 14 and light source 25 may be swapped).

In preferred embodiments, the apparatus 100 is configured to perform spinning disk confocal microscopy and the light source 25 is arranged to direct the laser beam 65 onto the spinning disk assembly 11, 15, and in particular onto the lens disk 15 (when present). The beam 65 from the light source 25 is incident on the lens disk 15 and illuminates a plurality of the lenses 17 (or pinholes if the lens disk is not present) simultaneously. Each illuminated lens 17 focuses a respective light beam 65A on a respective pinhole 19 of the scanning disk 11, each lens 17 typically being aligned with a respective pinhole 19. As such, a plurality of the pinholes are illuminated simultaneously. A respective light beam 65B emerges from each illuminated pinhole 19 and is focused on the object 55 via the objective 7 to illuminate a respect point 66, or spot, on the object 55 simultaneously. Thus, the objective lens 7 relays the image of the exit side of the pinhole disk 11 onto the sample 55, resulting in an array of light (usually laser) spots 66 on the sample 55. The light 65B incident on the object 55 may be referred to as the incident light or excitation light. As the disks 11, 15 rotate, different sets of lenses 17 and pinholes 19 are illuminated causing corresponding sets of points 66 on the object 55 to be illuminated. This, in combination with the pattern in which the lenses 17 and pinholes 19 are arranged, causes different parts of the sample 55 to be point-illuminated. Accordingly, the spinning disk 11, or spinning disk assembly, is configured to act as a scanner, causing the object 55 to be point-illuminated as the disks 11, 15 rotate. It is noted that the object 55 may remain static during this illumination, or more particularly there may be no relative movement between the objective 7 and the object 55 (or stage 20). The light source 25 is typically also fixed, or non-scanning.

Typically, the total number of pinholes 19 (and correspondingly lenses 17 in preferred embodiments) is in the order of hundreds or thousands (although it may be higher or lower depending on the embodiment, e.g. in the order of tens, or tens of thousands), and a portion (usually between approximately one twelfth and one twentieth of the total number) of the pinholes 19 may be illuminated at any one time as the disk 11 rotates. For example in preferred embodiments between 400 and 2000 pinholes 19 are simultaneously illuminated. Accordingly, at any given instant multiple (e.g. up to hundreds or thousands) points of the object 55 are illuminated simultaneously. Correspondingly, and as is described in more detail hereinafter, multiple instances (e.g. up to hundreds or thousands) of data may be obtained from the object 55 simultaneously. As such data may be gathered from specimens much more quickly than is possible using conventional single point scanning equipment. Further, the use of the scanning disk 11 allows relatively high powered laser light to be used in comparison with single point scanning equipment.

The light beam 65 is preferably collimated and typically comprises laser light. The light incident on the lens disk 15 does not need to be collimated; non-collimated light may be used, in which case the spacing between the lens disk 15 and pinhole disk 11 may be adjusted to compensate if required and/or the focal length of the lenses 17 may be adjusted accordingly. Light incident on the lens disk 15 but not incident on a lens is rejected (usually by a non transmitting coating). Light incident on the pinhole disk 11 but which misses the pinholes 17 is also rejected (usually by a non-transmitting coating). The lens disk 15 may be omitted, in which case the beam 65 may impinge directly on the scanning disk 11.

In typical embodiments, the lenses 17 and pinholes 19 are arranged in a plurality of spiral arms radiating from a common central point, for example in an Archimedean pattern or Nipkow pattern. The preferred arrangement is such that uniform illumination of the object 55 is achievable. It will be understood that other patterns may be used to creating the scanning illumination described above. In preferred embodiments, the pattern of the lenses 17 matches the pattern of the pinholes, and the lenses 17 and pinholes 19 are aligned with each other in the direction of travel of the light.

Preferably, the pinholes 19 are dimensioned such that the illumination points 66, or spots, on the object 55 are diffraction limited. Alternatively, the pinholes 19 may be larger than needed to generate a diffraction limited spot, which provides increased optical throughput of both illuminating light and increased throughput of the scattered light but sacrifices spatial resolution/confocality.

The diameter of the pinholes 19 is typically in the range 10 to 100 um. The spacing between pinholes 19 is typically 1000 um but may be higher or lower depending on factors such as the number of pinholes and/or the size of the image that is being passed through the optical system. In comparison with fluorescent microscopy, Raman microscopy involves analysing samples which generate considerably more ricocheting photons (specular or diffuse scattered light) and, as a result, typical embodiments have a wider pinhole spacing than found in a fluorescence microscope. As such, fewer pinholes are illuminated for a given field of illumination/field of view. However, some analysed samples might have very low levels of ricocheting photons and so a pinhole spacing the same or similar to that of a fluorescent microscope may be viable. The lenses 17 may be correspondingly sized and spaced apart.

Optionally, the spinning disk 11, or spinning disk assembly as applicable, is movable, by any suitable conveyancing means (not shown) into or out of the optical path. With the spinning disk 11 (or spinning disk assembly) in the optical path, the apparatus 100 is in a confocal mode in which it may perform spinning disk confocal laser microscopy. When the spinning disk 11 (or spinning disk assembly) is out of the optical path, the apparatus 100 may perform other types of microscopy, including widefield Raman spectroscopy, differential phase contrast microscopy, brightfield microscopy or epifluorescence microscopy.

When the light 65B is incident on object 55 one or more electromagnetic phenomenon may occur (including reflection, transmission, fluorescence, non-Raman light scattering, Raman scattering and others) depending on the nature or composition of the sample/specimen and/or on the characteristics of the incident light 65B. The apparatus 100 is configured to detect Raman scattered light, in particular spontaneous Raman scattered light (also known as normal or far-field Raman scattered light) and enhanced or near-field Raman scattered light. The apparatus 100 may also detect, if present, Resonance Raman light and/or Surface Enhanced Raman light.

Raman scattered light comprises light scattered by the sample/specimen 55 with a wavelength that is different than the incident light 65B, i.e. incident photons interact with molecule(s) in the sample/specimen 55 resulting in changed energy and therefore changed wavelength. Raman scattering is also known as inelastic scattering and occurs spontaneously in the sample/specimen in response to the incident light. Raman scattered light includes Stokes scattered light, which comprises Raman scattered light in cases where the excitation photon interacts with the molecules in the sample/specimen such that scattered photon has less energy (i.e. has a longer wavelength—Red Shifted) than the excitation photon, and Anti-Stokes scattered light, which comprises Raman scattered light in cases where the excitation photon interacts with the molecules in the sample/specimen such that scattered photon has more energy (i.e. has a shorter wavelength—Blue Shifted) than the excitation photon. The Raman scattered light is emitted by the object 55 and is detected as hereinafter described. Since the Raman scattered light results from interaction with the molecules of the specimen/sample 55 being analysed, its characteristics may be used to provide an indication of the characteristics (e.g. the chemical composition) of the object 55. The temperature of the object 55 may also be determined from the Raman scattered light, and for example can be derived from the ratio of the Stokes and Anti-Stokes signal strengths of a given Raman band.

The non-Raman scattered light comprises elastic scattered light, which is light scattered by the sample/specimen 55 whereby the wavelength does not change, i.e. the incident photon interacts with molecules in the sample but has not changed energy (wavelength).

In response to irradiation of the object 55 by the light 65B, scattered light emits from the object 55 in all directions and a portion of this light passes through the objective lens 7. It is noted that the object 55 remains static during this collection of light, or more particularly there is no relative movement between the objective 7 and the object 55 (or stage 20). The light source 25 is also fixed, or non-scanning. The imaging optical system 30 directs this portion of the scattered light to the intermediate image plane in which the scanning disk 11 is located. The configuration of the imaging optical system 30 is such that only light than emanates from currently illuminated points 66 of the object 55 is focused on the intermediate image plane, and as such passes through the pinholes 19. In particular, the arrangement is such that light emanating from each illuminated point 66 on the object passes through the respective pinhole 19 through which it is illuminated. Light not emanating from the illuminated spots 66, e.g. light from secondary (or multiple) reflections, is focused above or below the intermediate image plane, or is incident on the pinhole disk 11 but not on a pinhole, and so is rejected by the scanning disk 11, typically facilitated by a non-transparent coating on the disk 11.

Accordingly, light is collected confocally. It is noted that the pinhole size and magnification of the objective lens 7 determine the size of the laser spots 66 on the sample 55 and therefore dictate the spatial resolution of the collected Raman spectra. The pixels of the image sensor of the optical detector 76 should be appropriately selected to ensure the detector 76 does not under-sample the Raman spectra and result in a loss of resolution. In some embodiments, it may be beneficial to use relatively large pinholes that are not optimised to generate or collect light from a diffraction limited spot (as would be typical when performing confocal microscopy). This arrangement facilitates the collection of some reflected/ricocheted photons (reflected in the direct vicinity of the illuminated spot 66) such that more Raman photons are measured. This approach would give a superior signal intensity at the detriment of resolution.

The scattered light that passes through the pinholes 19 comprises scattered photons including elastically scattered photons (of the same wavelength as the laser light 65) and inelastically scattered Raman photons (which have different wavelengths to that of the excitation light 65). The scattered light passing through the scanning disk 11 is incident on the beam splitter 12 which is configured such that only the Raman scattered light reaches the spectrograph 14. In the illustrated embodiment, the beam splitter 12 is configured to allow the elastically scattered light to pass through it and travel back towards the light source 25 (or otherwise away from the spectrograph 14), but reflect or otherwise direct the Raman scattered light to the spectrograph 14, via the optical relay 13, 13' in this example. The imaging optical system 30 is configured to relay, or direct, the Raman light from the intermediate image plane (in which the scanning disk 11 lies) to the spectrograph 14.

For most spontaneous Raman imaging applications the scatter from the sample is higher for micro-crystalline materials than for single crystals or non-crystalline materials. It is preferred therefore to use a scanning disk 11 that is configured to suit the application in terms of any one or more of the size of the pinholes 19, the number of pinholes 19, the spacing between pinholes 19 and/or the pattern of the pinholes 19. Optionally, a plurality of different scanning disks 11 (and corresponding lens disks 15 as applicable) are provided, a respective one being selected and installed in the apparatus 100 to suit the application in order to optimise Raman light collection from a particular sample type, e.g. relatively closely spaced pinholes for analysing silicon wafers or graphene monolayers, or relatively widely spaced pinholes for analysis of forensic type powder samples or pharmaceutical tablets. For example, the scanning disk 11 may have between two and twelve nested pinhole spirals per disk depending on the application, although a single pinhole spiral or more than 12 nested pinhole spirals may alternatively be used. Fewer nested spirals reduces imaging speed for a specific disk rotation speed. An image can be acquired for 1/n nested spirals where n is the number of nested spirals (e.g. a disk with 10 nested spirals produces a complete sample illumination pattern for every 10th of a disk rotation, 2 nested spirals would mean an image could only be collected every ½ a rotation of the disk).

In preferred embodiments, the apparatus 100 includes a magazine (not shown) for holding multiple scanning disk assemblies, and a power-operated actuation system configured to install any selected one of the disk assemblies in the optical path, typically under control of the controller 50. Alternatively a selected disk assembly may be placed in a removable cartridge which may be manually installed or replaced as needed. Alternatively still, there may be one or more scanning disk assembly, wherein the or each disk has a plurality of sectors, each sector having a different arrangement of pinholes/lenses.

The beam splitter 12 may be configured to act as a filter, e.g. a short pass, long pass, band pass or notch filter as required, to control which wavelength(s) of light are allowed to reach the spectrograph 14. For example, to facilitate the collection of Stokes Raman scattered light, the beam splitter 12 may be configured as a short pass filter which transmits all light on the shorter, or blue, side of a specified wavelength, and reflects the Stokes scattered photons (which are red shifted and have a longer wavelength) towards the spectrograph 14. Alternatively, the beam splitter 12 may be configured to act as a notch filter that transmits light in at the wavelength of the excitation light 65 and reflects other light, including Stokes (red) shifted and anti-Stokes (blue) shifted light. Alternatively, the beam splitter 12 may be configured to act as a long pass filter that only reflects the Anti-stokes spontaneous Raman emissions. It will be understood that in alternative embodiments in which the imaging system 30, and in particular the beam splitter 12, is configured the transmitted light that reaches the spectrograph 14 and the reflected light that is directed away from the spectrograph 14, the beam splitter 12 may be configured in a manner that is the opposite to the configurations described above.

Optionally, the beam splitter 12 is removable and may be replaced by an alternative beam splitter with different transmission/reflection characteristics to suit different applications. Optionally, the apparatus 100 comprises a plurality of beam splitters 12, each having different transmission/reflection characteristics, provided on a conveying device (not shown) that is operable to locate any one of the beam splitters 12 in the optical path at a time. The conveying device may take any suitable form, for example comprising a wheel or linear conveyor, and may be manually moveable or power operated (e.g. by an electric motor) to move a selected one of the beam splitters 12 into the optical path. Supporting the use of different beam splitters 12 is advantageous not only in that it facilitates analysis of different types of emissions from the object 55 (e.g. switching between collection of Stokes scatter, or anti-Stokes scatter, or a simultaneous Stokes/anti-Stokes scatter), but also in that it facilitates the use of different light sources 25, i.e. producing light 65 with different wavelengths, which may be desirable as certain lasers are more sensitive when analysing certain types of samples.

Optionally, the imaging optical system 30 may include one or more optical filter 32 in the optical path, the filter(s) 32 being configured to remove, from the light that emanated from the object 55, light with wavelength(s) that are not desired for the analysis being performed. In the illustrated embodiment, optical filter 32 is located between the beam splitter 12 and the spectrograph 14, conveniently between the relay lenses 13, 13'. The filter(s) 32 may be located elsewhere in the optical path on the detector side of the beam splitter 12. By way of example, some elastically scattered photons may be reflected by the beam splitter 12, and the filter 32 may be configured to reject this elastically scattered laser light to prevent it from reaching the spectrograph 14. The filter 32, which is typically a notch or edge filter, is preferably configure to reject light in the wavelength band corresponding to the light beam 65 produced by the light source 25.

Optionally, one or more polarisation analyser 33, for example comprising one or more polarising filter and/or other optical polarising component(s), is provided in the imaging optical system 30. The polarisation analyser 33 may be provided in any suitable location in the optical imaging path. Preferably, the polarisation analyser 33 is located between the beam splitter 12 and the spectrograph 14. The relative orientation of polariser 26 and polarisation analyser 33 affects the spectral pattern observed at the output. For example, when polarisation analyser 33 is orientated parallel to polariser 26 there is a specific spectral pattern, whereas if the two optical components 26, 33 are oriented such that polarisations are crossed, i.e. are non-parallel, then a different spectral pattern is observed. The different peak intensities observed in these two polarisations may correspond to the symmetry of a molecular vibration.

It will be apparent from the foregoing that in preferred embodiments, a scanning Nipkow disk pair is illuminated with excitation light so as to scan a multiplicity of points over the sample 55, typically its surface, and to collect spontaneous Raman scattered light through the same disk pinholes, and to direct the collected light to the spectrograph 14. Embodiments of the invention may also detect Resonance Raman light and/or Surface Enhanced Raman light.

In preferred embodiments, the light received at the spectrograph 14 consists of Raman photons since any other photons that were collected simultaneously from the object 55 are removed or rejected by the image optical system 30, in particular the beam splitter 12 and/or filter(s) 32 before reaching the spectrograph 14. It is noted that a relatively low level of residual laser/Rayleigh photons may not be rejected or removed by the image optical system 30 and may still be present. Nevertheless, the light predominantly or substantially consists of Raman photons.

The Raman light collected by the imaging optical system 30 and delivered to the spectrograph 14 contains light, or photons, at a plurality of different wavelengths, and which have emanated simultaneously from different locations of the object 55 as determined by the locations of the illuminated spots 66. The wavelengths of the collected light are typically in the UV-Visible-Near IR range of wavelengths. The spectrograph 14 simultaneously receives a plurality of beams 67 of collected light. Typically, each beam 67 corresponds to a respective simultaneously illuminated spot 66, i.e. each beam 67 comprises Raman light emanating from a respective simultaneously illuminated spot 66. The beams 67 are simultaneously directed to the entrance aperture 74 of the spectrograph 14 by the imaging optical system 30. The spectrograph 14 is configured to chromatically disperse each received beam 67 to produce a respective Raman spectrum. The Raman spectra are then detected by the detector 76.

Figure 8:
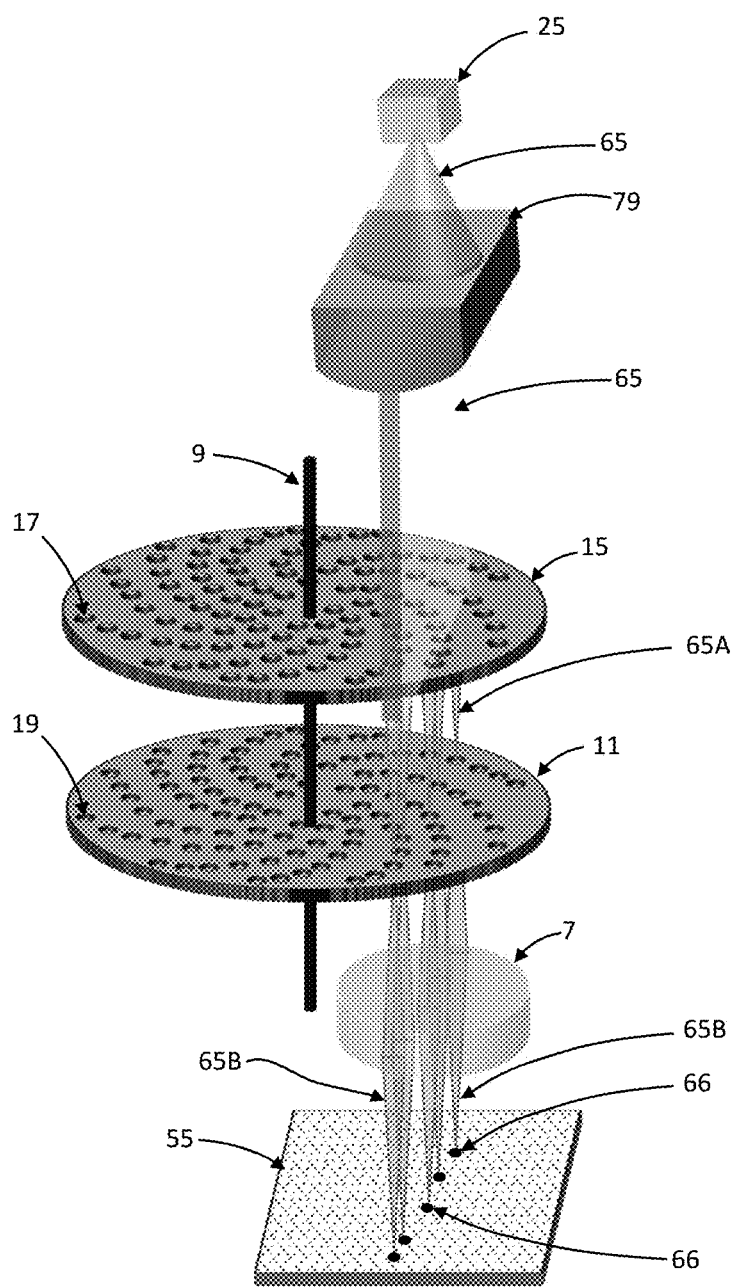
FIG. 8 is a schematic illustration of a first embodiment of a scanning disk assembly suitable for use in the apparatus of FIG. 1 or FIG. 7.
Figure 9:
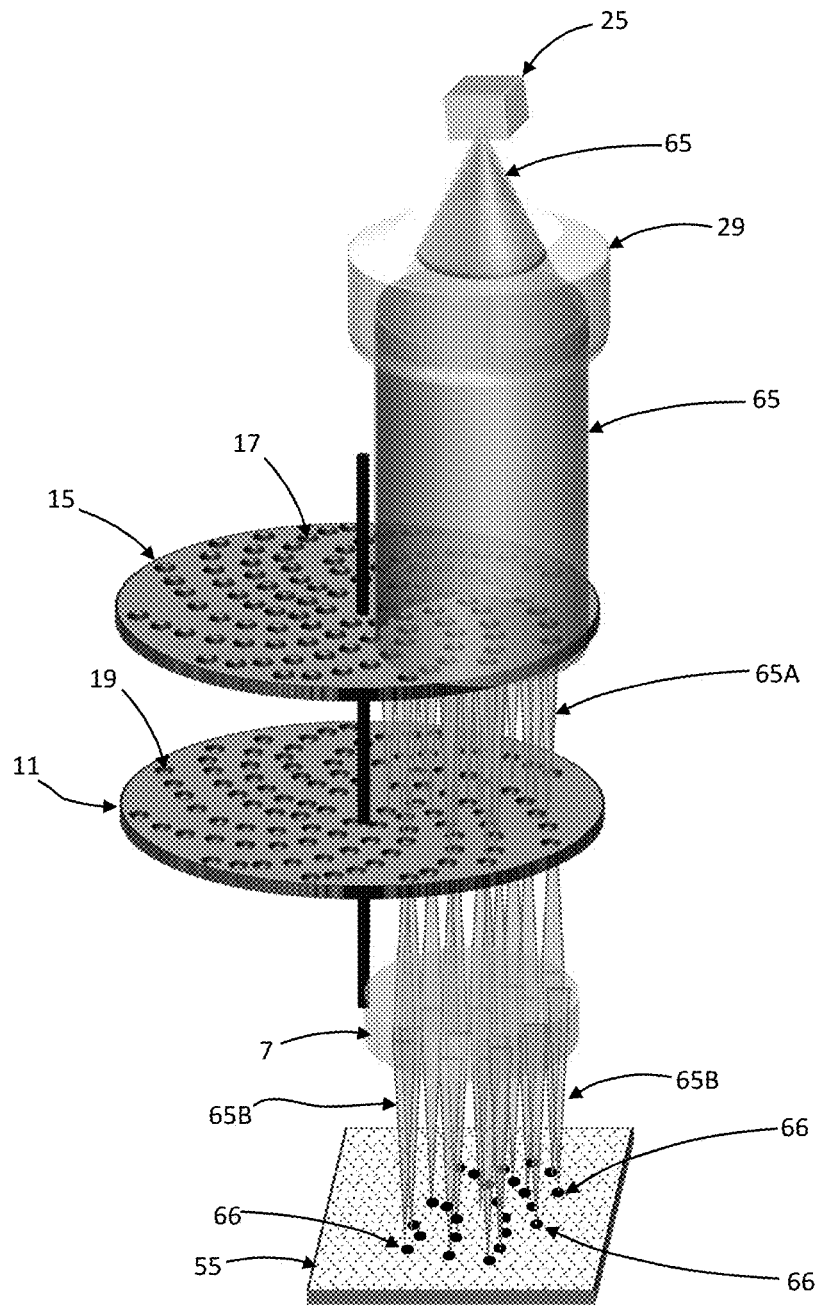
FIG. 9 is a schematic illustration of a second embodiment of a scanning disk assembly suitable for use in the apparatus of FIG. 1 of FIG. 7.

Depending on the configuration of the irradiation optical system 45, the spots 66 that are simultaneously illuminated may be arranged in a line (or a 1-dimensional array), as is illustrated by way of example in FIG. 8, or may be arranged in a 2-dimensional array, as is illustrated in FIG. 9. When arranged in a line, the line may be straight, but may alternatively be curved or have any other linear shape. When arranged in a 2-dimensional array, the array may be a regular array, but does not need to be, and can take any convenient shape. Typically, the shape of the line or array of spots 66 is dependent on the arrangement of the pinholes 19 in the scanning disk 11, and may also depend on the shape of the beam 25 that is directed onto the spinning disk assembly 11, 15, and in particular onto the lens disk 15 (when present), from the light source 25. In the example of FIG. 8, the beam 25 has a rectilinear, or narrow rectangular, cross-section, which may be created using any suitable conventional beam shaping optical element(s) 79, e.g. a cylindrical lens, (which may be provided instead of collimating lens 29). In the example of FIG. 9, the beam 25 has a circular cross-section, which may be created using any suitable conventional beam shaping optical element(s) 29 (which may for example be the collimating lens 29). In each case, the beam 25 irradiates a correspondingly shaped portion of the disk assembly 11, 15, which determines which set of pinholes 19 are irradiated at any given time, which in turn determines the number of, and spatial arrangement of, the spots 66.

Figure 11C:
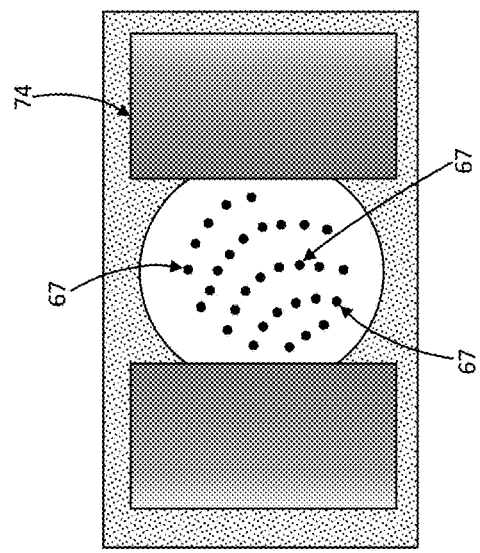
FIG. 11C is a front view of the entrance aperture of the spectrograph in a wide aperture configuration when the sample is illuminated using the scanning disk assembly of FIG. 9.
Figure 11B:
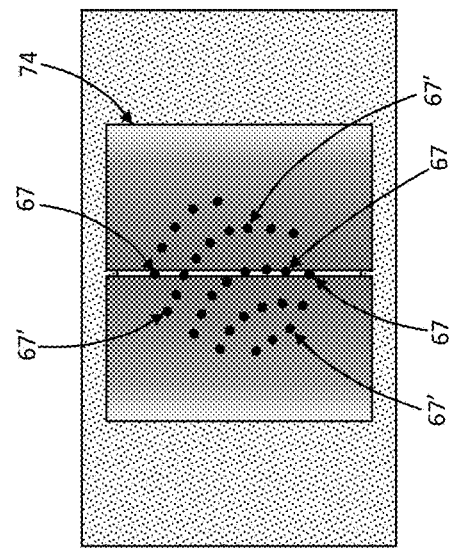
FIG. 11B is a front view of the entrance aperture of the spectrograph in a slit aperture configuration when the sample is illuminated using the scanning disk assembly of FIG. 9.
Figure 11A:
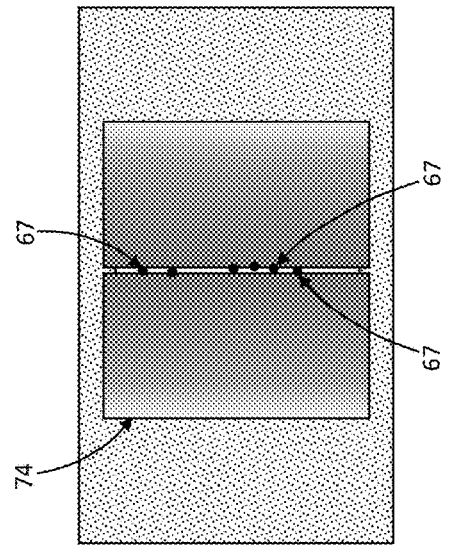
FIG. 11A is a front view of the entrance aperture of the spectrograph in a slit aperture configuration when the sample is illuminated using the scanning disk assembly of FIG. 8.

In preferred embodiments, the beams 67 received by the spectrograph 14 are arranged in a linear array. Typically, this is facilitated by the entrance aperture 74 being configured as a slit, which is typically straight or rectilinear, through which the beams 67 pass into the spectrograph 14. With reference in particular to FIG. 11A, in cases where the simultaneously irradiated spots 66 are arranged in a linear array (as illustrated in FIG. 8 for example), the corresponding beams 67 are arranged in a corresponding linear array that is aligned with the slit 74 such that the beams 67 pass through the slit 74. With reference in particular to FIG. 11B, in cases where the simultaneously irradiated spots 66 are arranged in a 2-dimensional array (as illustrated in FIG. 9 for example), the corresponding beams 67, 67' are arranged in a corresponding 2-dimensional array, but only those beams 67 that are aligned with the entrance aperture 74 pass through the slit and are received by the spectrograph 14. The slit 74 restricts the light entering the spectrograph 14 by rejecting light not incident on the slit 74. Typically, the width of the slit 74 is 10 to 300 um. The imaging optical system 30 and/or the spectrograph 14 (or at least its entrance aperture 74) may be configured in any convenient manner to facilitate alignment of the beams 67, 67' and the entrance aperture 74 as required.

In preferred embodiments, the entrance aperture 74 is located in an input focal plane of the spectrograph 14, and the imaging optical system 30 is arranged to focus the beams 67, 67' onto the input focal plane.

Figure 3:
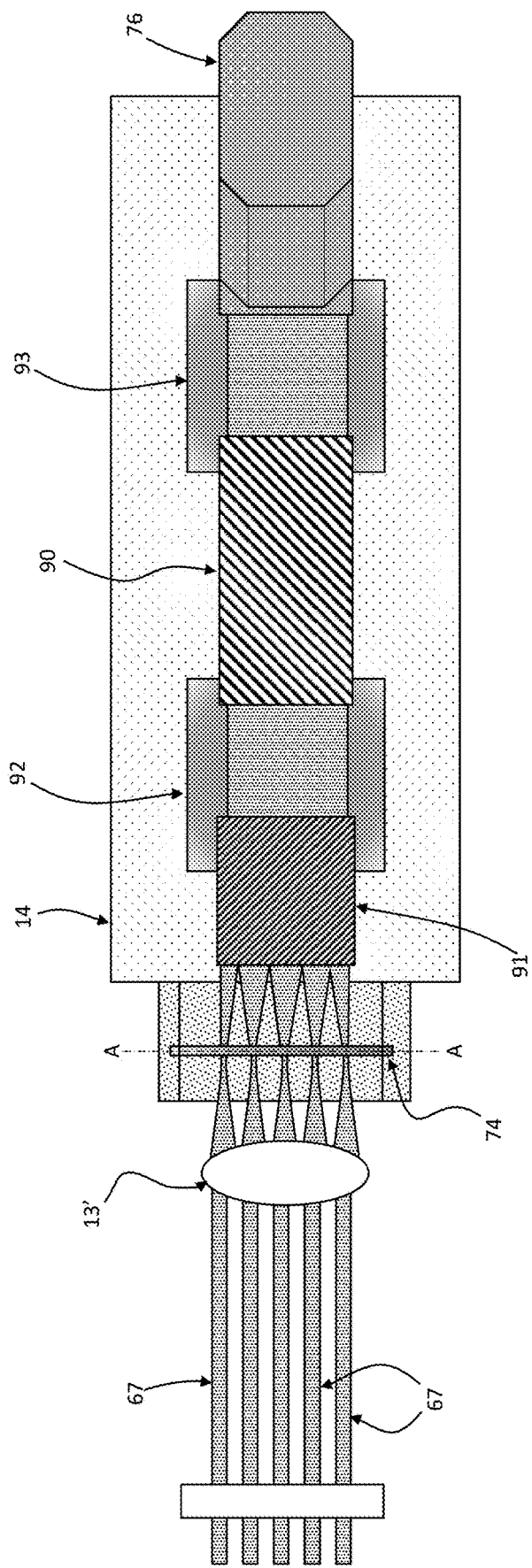
FIG. 3 is a side view of a spectrograph being part of the apparatus of FIG. 1.
Figure 4:
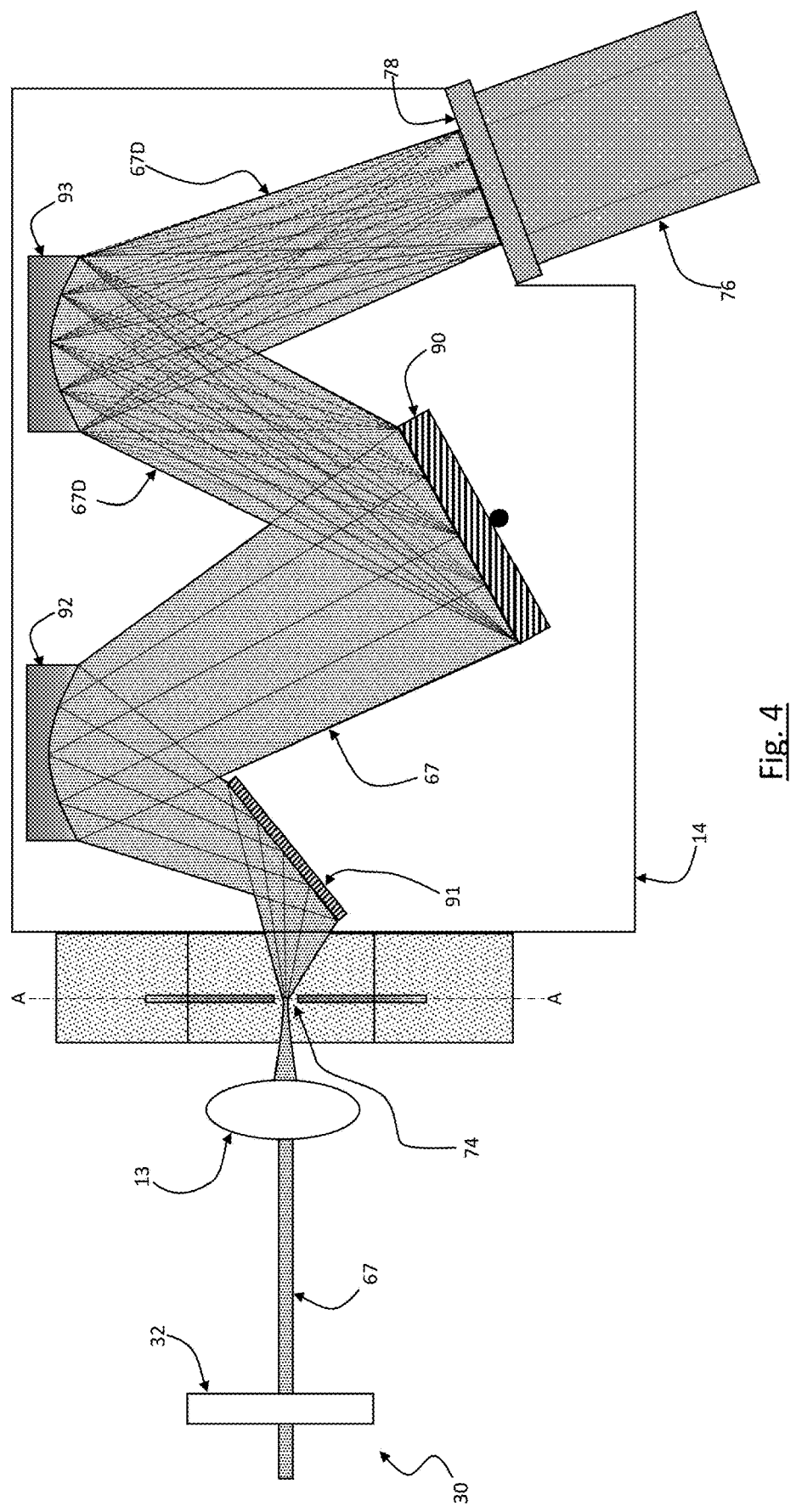
FIG. 4 is a plan view of the spectrograph.

FIGS. 3 and 4 show an exemplary configuration of the spectrograph 14. Each received beam 67 is directed onto a dispersion element 90, which in this example comprises a diffraction grating, in particular a reflective grating. Typically, the grating 90 is used in its standard 1st order diffraction angle of incidence mode. Each received beam 67 may be directed onto the dispersion element 90 by any convenient means, typically comprising one or more mirrors 91, 92 and/or other optical element(s). In the illustrated example, mirror 92 is a collimating mirror 92 configured to collimate and direct received light onto the grating 90. The dispersion element 90 chromatically disperses each beam 67 to produce a respective dispersed beam 67D. The dispersed beams 67D are focused onto the exit focal plane of the spectrograph 14. In the illustrated embodiment, this is achieved by focusing mirror 93, but may alternatively be achieved by any other convenient focusing means. It will be understood that in alternative embodiments (not illustrated) different configurations of the spectrograph, or alternative types of spectrograph, may be used as is convenient. For example, in alternative embodiments different arrangements of mirror(s) and/or grating(s) may be used. Lens(es) may be used as well as or instead of mirror(s), and transmissive grating(s), prism(s) or other optical dispersion element(s) may be used as well as or instead of reflective grating(s), or a single concave reflection grating may be used instead of an arrangement of grating and mirror(s). More generally, the spectrograph 14 is configured to disperse by wavelength, or chromatically, each beam 67 received at the entrance aperture 74 and to focus the dispersed beams 67D onto the exit focal plane at the exit aperture 78.

Figure 2:
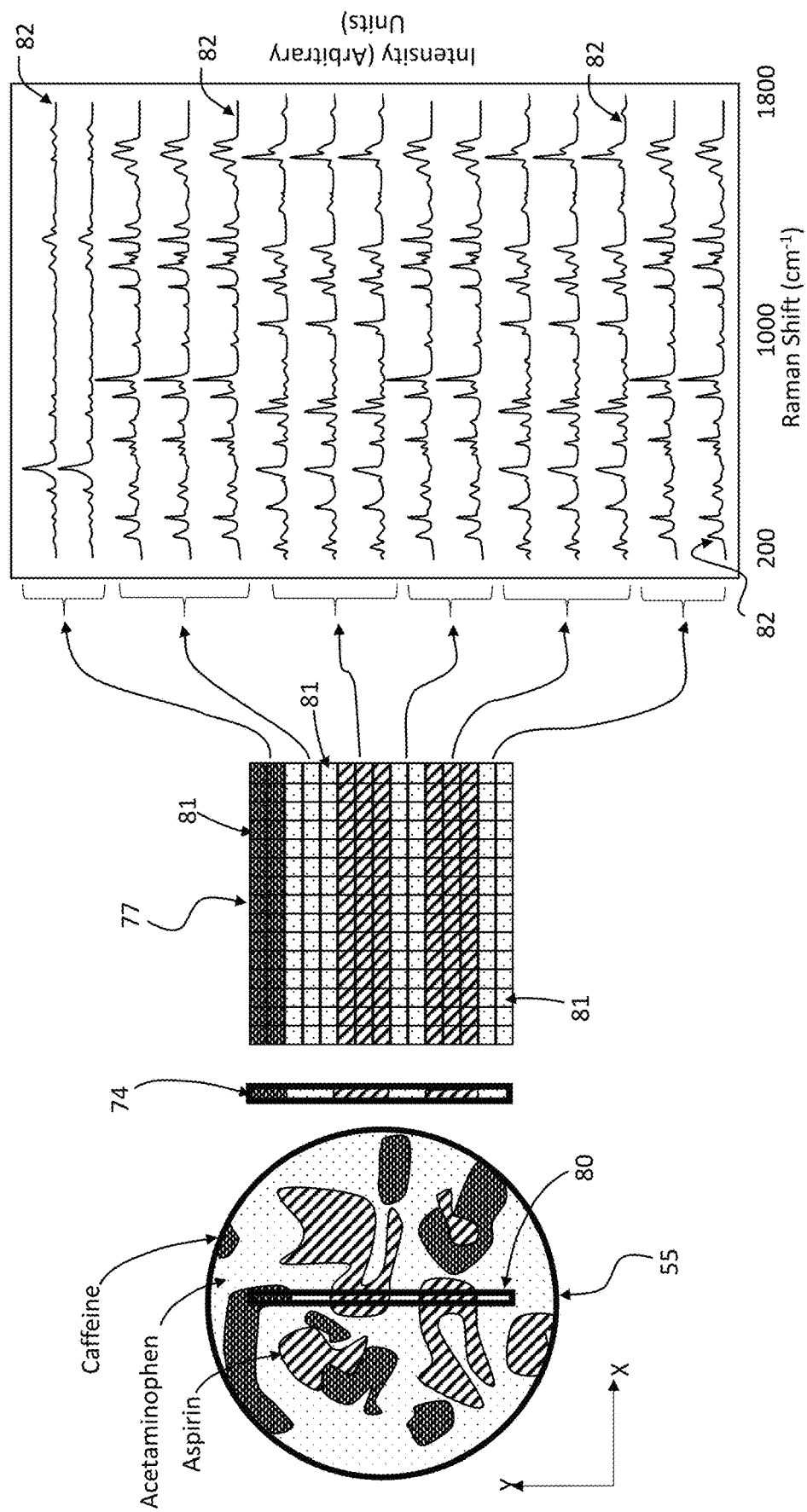
FIG. 2 illustrates a sample, a portion of the sample analysed as part of line scan data collection, a representation of an image collected at a camera, and the associated Raman spectra corresponding to the composition of the sample at the points from which the light is collected.

With reference in particular to FIG. 2, the beams 67 that are simultaneously received by the spectrograph 14 correspond to a region 80 of the sample 55 that is being analysed by the apparatus 100 at any given time, i.e. during any given measurement performed by the apparatus 100. The region 80 is the part of the sample 55 containing the simultaneously illuminated spots 66 that correspond to the beams 67 received by the spectrograph 14 during the measurement. In preferred embodiments, therefore, the region 80 is substantially linear. In preferred embodiments, the size and shape of the region 80 is dependent on the size and shape of the entrance aperture 74. In FIG. 2, the region 80 is shown as being rectangular, or slit-like, but may take other shapes. Typically, the region 80 has a length in the order of millimetres or centimetres, but width in the order of microns. Unlike conventional line scan Raman spectroscopy, the region 80 is not illuminated by a continuous line of light, but instead is illuminated by an array of spaced apart light spots 66. The corresponding beams 67 are simultaneously and separately directed to the entrance aperture 74 of the spectrograph 14 by the imaging optical system 30. It is noted that the spots 66 corresponding to the region 80 preferably form a linear, or one-dimensional, array. The array may be, but is not necessarily straight, since its shape depends on the pattern in which the pinholes 19 are arranged. The spectrograph 14 simultaneously disperses each of the received beams 67 by wavelength to produce a respective Raman spectrum 82 for each beam 67. Typically, a respective single Raman spectrum is produced for each illuminated spot in the region 80. Each spectrum typically contains spectral information of all chemical species at the respective illuminated spot. If, for example, the sample 55 is microcrystalline, then the respective single spectrum arising from the respective single diffraction limited point of illumination may be a co-addition of the spectra of multiple chemical species. Illuminating the sample 55 with only a line of spots 66 (as illustrated in FIG. 8 for example) to correspond with the region 80 of the sample which is being imaged through the spectrograph slit 74 is preferred as provides efficient use of the illumination light (in comparison for example with the arrangement of FIG. 9 which is more wasteful of light).

The Raman spectra 82 are detected by the detector 76 which is typically located at the exit focal plane of the spectrograph 14. The dispersed beams 67D are focused onto the exit focal plane by the spectrograph, and therefore onto the detector 76. Typically, the detector 76 comprises an image sensor 77 comprising an array of pixels 81, the image sensor 77 typically being part of a digital camera. The image sensor 77 is located in the exit focal plane of the spectrograph 14. The image sensor 77 may have one or more line, row or other group of pixels 81 for each of the dispersed beams 67D, i.e. for each Raman spectrum 82. In the example of FIG. 2, the sensor 77 has one row of pixels 81 for each spectrum 82, although each spectrum 82 may be produced from one or more line, row or group of pixels 81 in any other convenient manner. For example, as a result of the spinning of the disk 11, one or more line, row or group of pixels 81 may detect Raman light from multiple illuminated spots 66. In any event, the detector 76 may include a processor (not shown) configured to produce the Raman spectra 82 from the Raman light detected by the pixels 81 as required. The configuration is such that the spectrograph 14 directs the respective dispersed beam 67D onto the respective pixel row(s) or line(s) of the sensor 77 in order to detect the respective spectrum 82.

It will be apparent from the foregoing that the apparatus 100 simultaneously collects a plurality of beams 67 of Raman light confocally. Accordingly, in comparison with conventional confocal Raman spectroscopy the apparatus 100 performs Raman analysis of the sample 55 more quickly, and in comparison with conventional line scan Raman spectroscopy the apparatus 100 performs Raman analysis more accurately. The use of the spinning disk assembly 11, 15 provides confocal sectioning such that the slit 74 is not required to perform out of plane rejection as is the case for conventional line scan Raman spectroscopy, and so the apparatus 100 operates truly confocally, unlike the standard approach.

Figure 10:
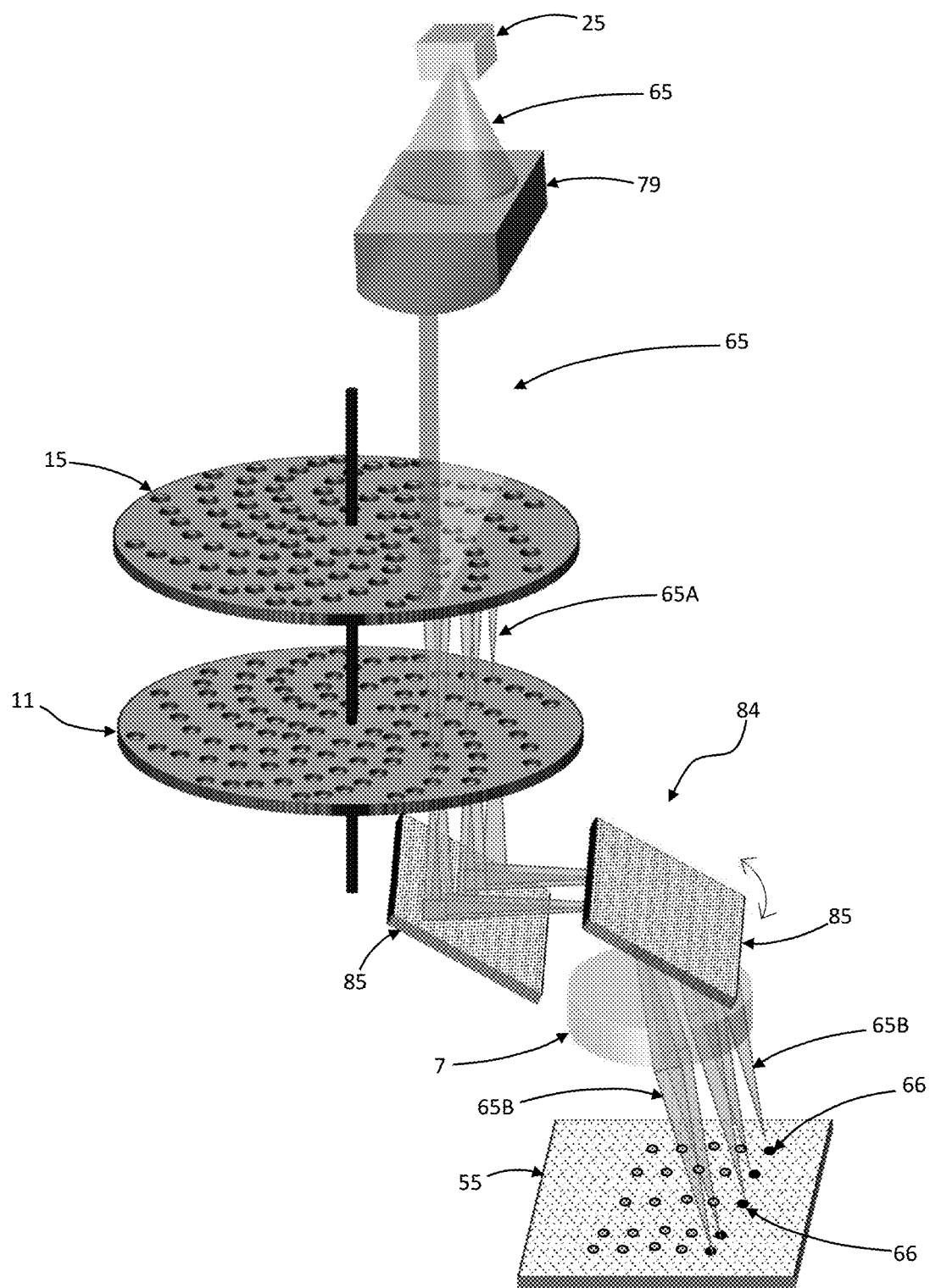
FIG. 10 is a schematic illustration of a third embodiment of a scanning disk assembly being suitable for use in the apparatus of FIG. 1 or FIG. 7.

In each measurement, the apparatus 100 collects multiple Raman spectra in respect of the linear region 80 of the sample 55. In the illustrated embodiment, region 80 corresponds to the line of spots 66 on the sample 55 (see FIG. 8). In FIG. 2, the region 80 is shown as being rectangular since the spinning of the disk 11 results in the sensor 77 detecting a rectangle of evenly illuminated light. In order to collect Raman spectra for the whole sample 55, or at least for the whole target area of the sample 55, the apparatus 100 performs multiple measurements with the sample region 80 at a different location of the sample 55 for each measurement. Preferably, this is achieved by scanning the region 80 with respect to the sample 55 in an axial direction that is perpendicular to the longitudinal axis of the region 80. For example, in FIG. 2, the longitudinal axis of the region 80 is assumed to be along a Y-axis, and the region 80 is scanned in a direction along the perpendicular X-axis. For each location along the X-axis, a respective measurement is made such that the corresponding Y-axis spectra are obtained. It is noted that there is no relative movement between the region 80 and the sample 55 while each measurement is being performed; instead the region 80 is moved between measurements. Relative movement between the region 80 and the sample 55 may be achieved by any convenient means. For example, the sample 55 may be moved with respect to the objective 7. This movement may conveniently be achieved by moving the stage 20. To this end, the stage 20 may be a movable stage, and may be coupled to any conventional powered drive means (typically comprising a motor) for moving the stage 20. In this example, the stage 20 is movable at least along the X-axis, although may also be movable along the Y-axis and/or the Z-axis. Referring to FIG. 10, alternatively, or in addition, the irradiation optical system 45 may include a scanning system 84 configured to move, or scan, the incident light 65B with respect to the sample 55. The scanning system 84 may take any convenient form, for example comprising one or more scanning (e.g. tiltable) mirror 85. Preferably, the scanning system 84 is located between the pinhole disk 11 and the objective 7. The scanning system 84 is preferably motorised. Alternatively, or in addition, the location of the region 80 may be moved by moving the location of the entrance aperture 74 between measurements. Any convenient scan rate may be used for the region 80, as suits the application. Typically, the rate at which the region 80 is scanned is slower than the scan rate of the illumination spots 66.

Accordingly, in preferred embodiments, the apparatus 100 performs line scanning confocal Raman spectroscopy, whereby truly confocal Raman spectral analysis of the sample 55 is provided.

Optionally, Raman spectroscopy apparatus embodying the invention may be configured not only to perform confocal Raman spectroscopy as described above, but to alternatively perform Raman imaging of the sample 55. Such apparatus are operable in either one of a Raman spectroscopy mode or a Raman imaging mode. In the Raman spectroscopy mode, the apparatus may be configured as described above unless indicated otherwise hereinafter. In the Raman imaging mode, the apparatus is configured to capture at least one Raman image of the entire sample 55, or at least the entire target area of the sample 55. Each Raman image comprises Raman photons collected simultaneously, or substantially simultaneously, from different locations on the sample 55 in accordance with the points 66 that are simultaneously, or substantially simultaneously, illuminated. In particular, upon rotation of the scanning disk 11 to point-illuminate the entire sample 55 (i.e. the entire target area to be analysed), the Raman image consists of Raman scattered light collected substantially simultaneously from all of the illumination points 66 across the entire target area of the sample 55, i.e. in the time taken for the scanning disk 11 to point-illuminate the entire target area of the sample 55. As such, in contrast to the Raman spectroscopy mode, in the imaging mode the Raman photons are not collected only from a given linear sample portion 80 at any given instant. In some embodiments, the apparatus may be configured to perform both Raman spectroscopy and Raman imaging simultaneously.

Capturing Raman images, as opposed to Raman spectra, is useful for analysing the composition of the sample 55, particularly when an expected composition is known, e.g. for the purpose of process control or quality control. This is because the presence of Raman light within a given wavelength range, or ranges, can be associated with the presence in the sample 55 of a corresponding chemical substance or other detectable substance. Moreover, since Raman images are produced, the spatial distribution of the respective substance in the sample 55 is detected. It is noted that, in Raman imaging mode, the apparatus does not detect the whole Raman spectra, but instead captures a respective Raman image corresponding to the, or each, selected wavelength band. Advantageously, each wavelength band is selected to correspond with wavelengths at which there is a peak in the Raman spectrum of a given target substance or species, and preferably also at which there is no peak in the respective Raman spectra of one or more other substance or species that may be present in the sample 55. In this context, a peak may be defined as the presence of Raman scattered light above a suitable threshold level. The threshold level may be set depending on the application, and may be determined empirically, or by calculation and/or by any suitable calibration process.

In order to perform Raman imaging, a spectral filter device in the preferred form of spectral analyser filter 70 is provided in the optical path of the imaging optical system 30. In the embodiment of FIG. 1, the spectral analyser filter 70 is located between beam splitter 12 and the spectrograph 14, but may be located elsewhere in the optical imaging system 30. The preferred spectral analyser filter 70 is adjustable, or tuneable, so that it transmits light only in a selected one or more of a plurality of selectable wavelength ranges. The spectral analyser filter 70 may comprise any suitable adjustable spectral filter device. For example, the spectral analyser filter 70 may comprise, without limitation, any one of the following devices: a liquid crystal tuneable filter (LCTF); an acousto-optic tuneable filter (AOTF); a plurality of different filters on a filter wheel or other movable carriage; a plurality of wavelength/angle tuneable filters on a pivotable filter wheel; a plurality of broad-bandpass filters used in conjunction with a Fabry Perot etalon; a pair of Fabry Perot filters; or a subtractive double monochromator (for example a first spectrograph may be configured to disperse the light and then refocus the light into a intermediate focal plane between the first spectrograph and a second spectrograph where a physical block is provided to allow only a specific wavelength range to pass; the second spectrograph is configured to un-disperse the light and a monochromatic or filtered image is placed at the output of the second spectrograph).

The preferred adjustability of the spectral analyser filter 70 allows the filter 70, and therefore the apparatus 100, in imaging mode, to be adjusted to image a particular target substance according to the wavelength of the collected Raman light. In alternative embodiments, the spectral analyser filter 70 need not be adjustable, or tuneable, but may instead be configured to pass light in a fixed wavelength band, or preferable a plurality of different, preferably discrete or non-overlapping, fixed wavelength bands. The fixed wavelength band(s) may be selected for analysing a sample 55 comprising specific substance(s) of interest, e.g. wherein the wavelength band(s) correspond to specific wavelength(s) of Raman light that emanate from the sample 55 during use. A plurality of such fixed filters may be provided, each with different pass band characteristics, and may be installed and removed as required depending on the composition of the sample being analysed.

In the imaging mode, the imaging optical system 30 is configured such that Raman light from the entire illuminated region of the sample 55 passes through the spectral analyser filter 70. Depending on the setting of the spectral analyser filter 70, all wavelengths except those in the, or each, selected wavelength range are rejected by the filter 70, and Raman light in the single selected wavelength band, or multiple selected wavelength bands, is allowed to pass. The spectral analyser filter 70 may subsequently be adjusted to allow Raman light from one or more different wavelength range to pass. This process may be performed for as many or as few wavelength ranges as desired, depending on the application. Hence, in preferred embodiments, the filter 70 is tuneable to allow light in any one of a plurality of different wavelength bands to pass through it simultaneously. Accordingly, if a target substance in the sample 55 is associated with Raman scattered light in multiple wavelength bands, then the filter 70 may be tuned to allow light in each of those bands to pass through it simultaneously. Alternatively, the filter 70 may be adjusted so that the light in each band passes through it in sequence, one band at a time. The presence of one or more chemical substances or other substances in the sample 55 can be detected by setting the spectral analyser filter 70 to pass Raman light in the respective wavelength range or ranges.

In preferred embodiments configured to support both the Raman imaging mode and Raman spectroscopy mode, the spectral analyser filter 70 is moveable with respect to the optical path (as indicated by arrow A in FIG. 1) such that it can be moved into the optical path for operation in the imaging mode, and out of the optical path for operation in the spectroscopy mode. Any convenient actuation means (not illustrated) may be provided for this purpose, preferably powered actuation means. For example the filter 70 may be provided on a movable carriage or stage that is preferably coupled to a motor or other drive means to effect movement. Alternatively, the spectral filter analyser 70 may be configurable to adopt a wide bandpass mode in which it passes wavelengths within a range that includes all Raman wavelengths of interest (e.g. a pass band from 200 nm to 1600 nm or wider), and may adopt the wide bandpass mode during Raman spectroscopy mode. In embodiments where Raman imaging is not supported, the spectral analyser filter 70 may be omitted. For example, in embodiments where the spectrograph 14 is configured as shown in FIG. 4, i.e. only to perform spectroscopy, the spectral analyser filter 70 may be omitted or bypassed (for example by providing one or more movable mirror operable to selectively cause the filter 70 to be bypassed or not bypassed).

Figure 5:
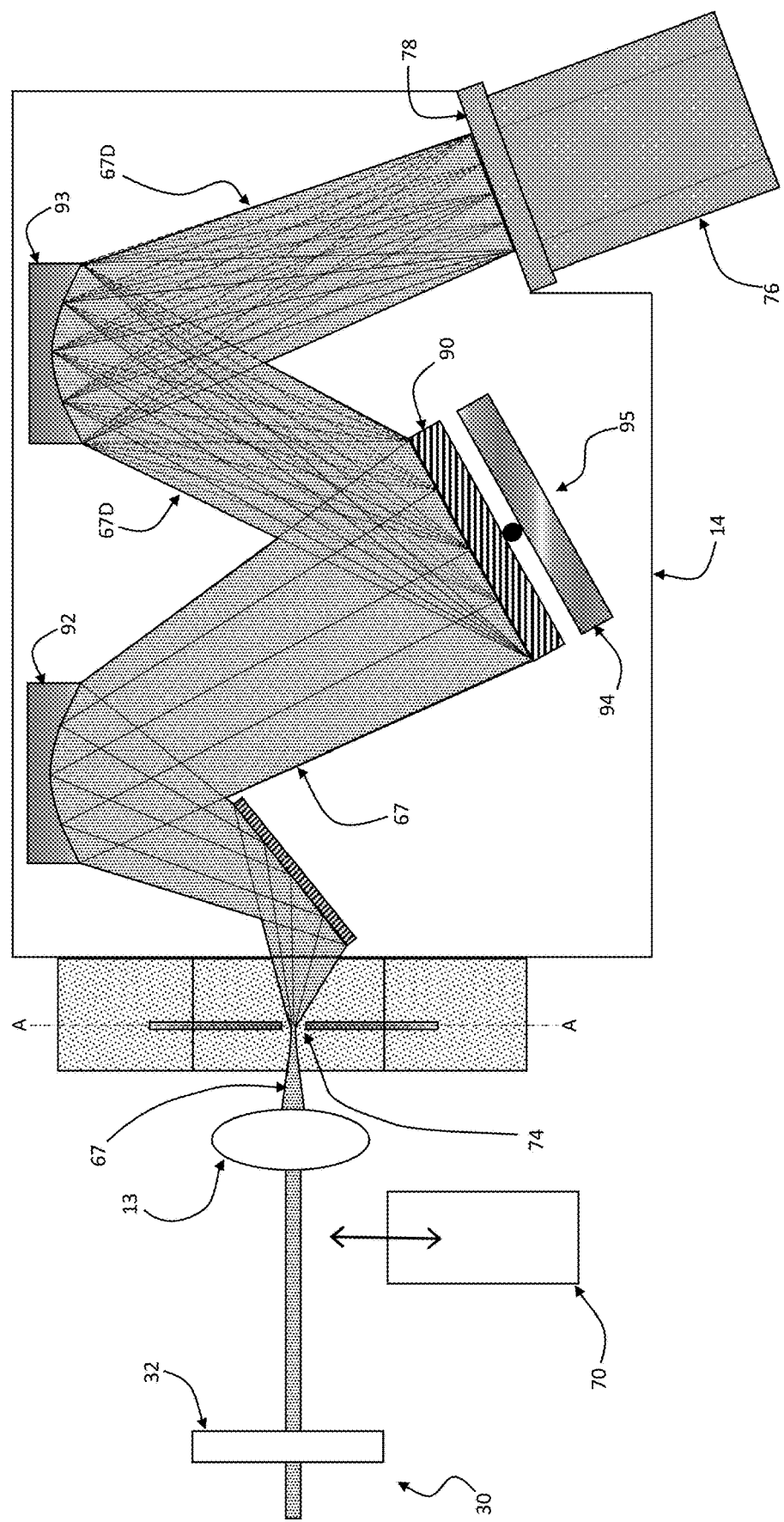
FIG. 5 is a plan view of a first alternative embodiment of the spectrograph.
Figure 6:
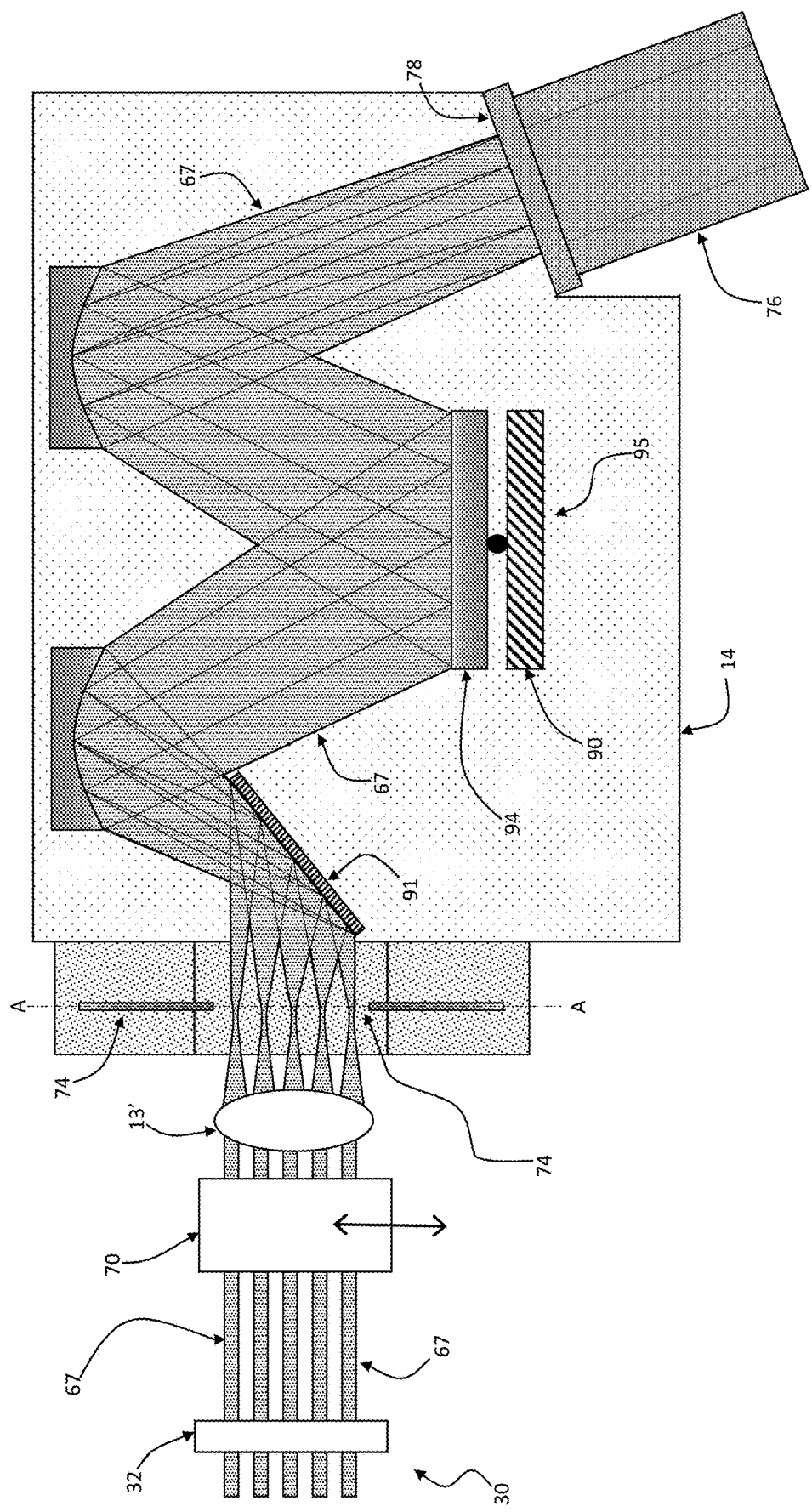
FIG. 6 is a plan view of a second alternative embodiment of the spectrograph.

The Raman images may be captured by the detector 76. However, in imaging mode, it is not desirable to chromatically disperse the Raman light that has passed through the filter 70. FIGS. 5 and 6 show an example of an alternative configuration of the spectrograph 14 suitable for use in the apparatus 100 to support both the Raman imaging mode and Raman spectroscopy mode. The spectrograph 14 of FIGS. 5 and 6 is similar to the spectrograph of FIG. 4 and the same or similar description applies, with like numerals being used to denote like parts, unless otherwise indicated as would be understood by a skilled person. In this embodiment, the dispersion element 90 (typically comprising a diffraction grating) is movable out of the path of the light that passes through the spectrograph 14, or is tunable or otherwise reconfigurable to be non-dispersive, and/or is replaced with a non-dispersion element, so that, in the imaging mode, the light is not chromatically dispersed. In the illustrated embodiment, the dispersion element 90 is replaceable by a non-dispersion element 94, conveniently a mirror or other optically reflecting and/or relaying element(s), which relays the light on towards the exit focal plane without dispersing it. In the preferred embodiment, in the spectroscopy mode, the dispersion element 90, as well as dispersing the light, reflects the light to mirror 93, and in the imaging mode the non-dispersion element 94 (in the preferred form of a mirror) is configured to reflect the light to mirror 93 instead of the dispersion element 90. A grating, in particular a reflective grating, preferably used at zero order, could be used to provide the same optical reflecting functionality as a mirror and could therefore be used as the non-dispersion element 94. In alternative embodiments, the dispersion element 90 may comprise a tunable diffraction grating, e.g. a tunable reflective grating, that is tunable to be dispersive or non-dispersive, in which case there is no need for separate dispersion and non-dispersion elements. In embodiments where the dispersion element 90 is tunable or otherwise configurable to be non-dispersive, there is no need to move the dispersion element 90.

In embodiments where the dispersion element 90 and non-dispersion element 94 are movable (for example the embodiment of FIGS. 5 and 6), the elements 90, 94 may be moved into and out of the path of the light by any convenient means. In the illustrated embodiment, the dispersion element 90 and non-dispersion element 94 are provided in an assembly 95, the assembly 95 being movable between a dispersion state (FIG. 5) in which the dispersion element 90 is located in the light path to chromatically disperse the light, and a non-dispersion state (FIG. 6) in which the non-dispersion element 94 is located in the light path. The assembly 95 may be rotatable between the dispersion state and the non-dispersion state. In the illustrated example, the elements 90, 94 are provided on opposite sides of the assembly 95, and the assembly is rotatable so that one or other of the elements 90, 94 is located in the path of the beams 67. Alternatively, the assembly 95 may be movable linearly or pivotably between the dispersion and non-dispersion states, and the elements 90, 94 may be positioned accordingly with respect to each other (e.g. side-by-side in the case of linear movement). Alternatively, the dispersion element 90 and non-dispersion element 94 may be individually movable into and out of the light path as required. Preferably, powered actuation means (e.g. comprising one or more motor) are coupled to the assembly 95, or individually to the elements 90, 94, as applicable, for effecting the relevant movement. Alternatively, the elements 90, 94 may be swapped manually depending on the desired mode of operation. In any event, when the apparatus 100 is in the Raman spectroscopy mode the dispersion element 90 is in the light path and so the spectrograph 14 disperses the light to produce the Raman spectra as described above, and when the apparatus 100 is in the Raman imaging mode, the non-dispersion element 94 is in the light path such that the spectrograph 14 does not perform chromatic dispersion on the Raman light. Instead, in the Raman imaging mode, the spectrograph 14 may be said to be configured to act as an image relay device that relays the light received at the input focal plane to the exit focal plane without performing chromatic dispersion.

In the Raman imaging mode, it is not desirable to restrict the Raman light entering the spectrograph 14 using the slit aperture 74 that is used in the spectroscopy mode, as illustrated in FIGS. 11A and 11B. Instead, a wider entrance aperture 74 is used, as for example is illustrated in FIG. 11C. This may be achieved by using a different structure to define the aperture 74 in each mode, or by using an adjustable aperture device that is configurable to provide the aperture 74 in different sizes. Preferably, the adjustable aperture device is power-operated, e.g. motorized. Preferably, in the imaging mode, the entrance aperture 74 is large enough to allow Raman light from the entire target area of the sample 55 to enter the spectrograph 74. By way of example, in the imaging mode the width of the aperture 74 may be between 300 um and 32 mm.

Figure 7:
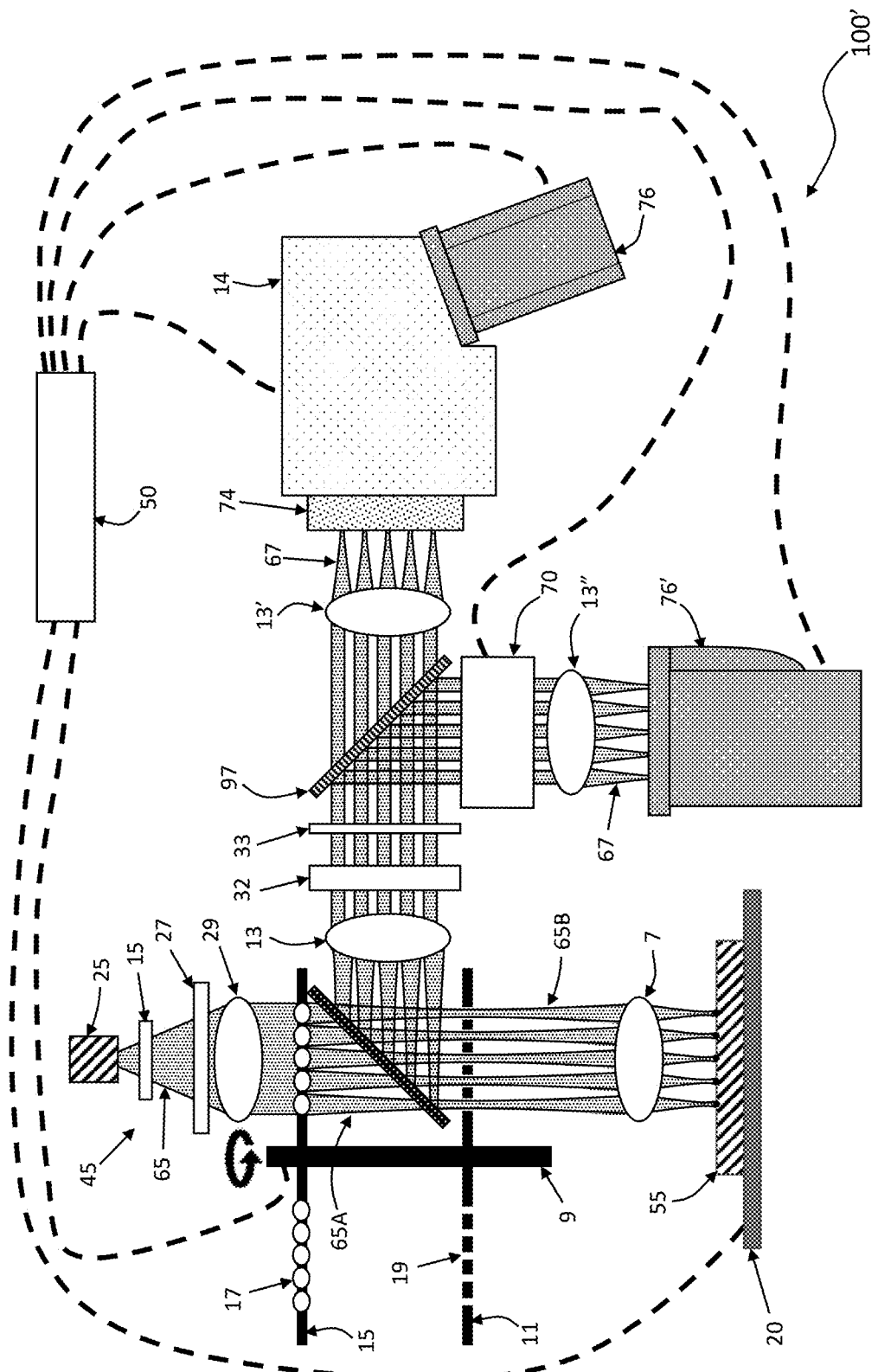
FIG. 7 is a schematic illustration of an alternative scanning disk confocal Raman spectroscopy apparatus embodying the invention.

FIG. 7 shows an alternative Raman spectroscopy apparatus 100' embodying the invention. The apparatus 100' is the same or similar to the apparatus 100 with like numerals being used to denote like parts and the same or similar description applying unless otherwise indicated. The apparatus 100' includes not only the spectrograph 14 (which may conveniently be as illustrated in FIG. 4) and the detector 76, but also a second detector 76', which may be the same as the detector 76. The spectral analyser filter 70 is included in the imaging optical system 30' and is located in the optical path before the second detector 76' but not in the optical path to the spectrograph 14. The imaging optical system 30' includes means 97 for directing the collected Raman light to the spectrograph 14 and/or to the second detector 76'. The directing means 97 may comprise a beam splitter (e.g. a dichroic mirror), a mirror or any other suitable optical beam switching or beam directing element(s). The directing means 97 may be movable with respect to the optical path, or may be otherwise adjustable, such that, in the spectroscopy mode, at least some of (preferably all of) the collected Raman light is directed to the spectrograph 14, and in the imaging mode at least some of (preferably all of) the collected Raman light is directed to the second detector 76'. In the spectroscopy mode, the apparatus 100' can perform Raman spectroscopy as described above using the spectrograph 14. In the Raman imaging mode, the apparatus 100' can perform Raman imaging as described above using the second detector 76'. Optionally, the directing means 97 (e.g. when in the form of a beam splitter) may be configured to cause a respective portion of the collected light to be directed to each of the spectrograph 14 and the second detector 76', in which case the apparatus 100' may perform both Raman spectroscopy and Raman imaging.

Optionally, the directing means 97 may be moveable into and out of the optical path such that, when located in the optical path (e.g. as shown in FIG. 7), it directs at least some of the light to one of the detector 76' or spectrograph 14 (the detector 76' in the example of FIG. 7), and when out of the optical path the light is directed to the other of the spectrograph 14 or detector 76' (the spectrograph 14 in the example of FIG. 7). The directing means 97 may be movable by any convenient means, preferably powered drive means, e.g. comprising a motor (not shown). The directing means 97, when in the optical path, may be located between the beam splitter 12 and the spectrograph 14, conveniently between the relay lenses 13, 13'. A third relay lens 13" may be provided between the spectral filter analyser 70 and the second detector 76'.

In the imaging mode, a Raman image of the entire object 55 (or at least the entire target area) is focused on the focal plane of the optical detector 76 (having been relayed though the spectrograph 14 in preferred embodiments) consisting of only Raman light in the selected wavelength range or ranges. Moreover, the images are captured confocally (since all Raman light has passed through the pinholes in the spinning disk 11). Capturing Raman images in the manner described above is very rapid in comparison with conventional methods of constructing Raman images, but it does not collect all Raman spectral information. The entire Raman spectra for every illuminated point on the sample 55 is incident on the spectral analyser filter 70 but only Raman light in one or more selected wavelength range is permitted to reach the optical detector 76 at any one time. By taking a plurality of Raman images at corresponding different wavelength ranges, a hypercube, or datacube, of images and a spectrum can be extracted from every pixel. A respective Raman image may be captured at every wavelength supported by the apparatus 100 in order to provide all spectral information at all data points. In particular, by arranging the captured information sequentially according to wavelength, a complete (or partial) spectrum may be constructed from every pixel in the image. The resulting data set contains the XY pixel information (optionally also Z data) and a spectrum or partial spectrum. This type of dataset may be referred to as a Hypercube of data or a Hyperspectral image datacube. This technique may involve collecting a complete image comprising all XY data for a single wavelength, and the missing spectral data may be collected by scanning the spectral analyser. For large images, this process would remain much faster than traditional point scanning. More generally, the higher the number of wavelength bands at which Raman images are captured the more spectral information is acquired. Depending on the application, the number of wavelength bands at which Raman images are captured may be selected to give adequate spectral information to ensure there are no incorrectly identified samples, while being executable fast enough to take the images in a timescale that would be practical (and still considerably faster than traditional point scanning). This approach is suitable for chemometrically or univariately separating spectral contributions from mixtures which do not contain isolated spectral features.

In contrast, in the Raman spectroscopy mode, each measurement provides confocal Y-axis imaging with wavelength data for each illuminated point 66. To obtain the datacube, the confocal X-axis data (and optionally Z-axis data if required) can be obtained by scanning as described above (and along the Z-axis if required).

Both the imaging and the spectroscopic modes can therefore provide a dataset of information, which for any focal position of the sample 55, comprises spatial X, spatial Y, optionally spatial Z, and wavelength information, i.e. a dataset that has up to four dimensions (X, Y, Z and λ). Each mode has relative merits depending on if the user has a bias towards imaging speed in (X,Y,Z) or obtaining a high degree of spectral information (λ).

The apparatus 100, 100' typically includes a control system comprising one or more controller 50 configured to control the operation of the apparatus 100, 100' as described herein, in particular to control any components that are power operated. Other components can be controlled manually as required. Typically the controller 50 is configured to control the operation of the, or each, optical detector 76, 76' the spectrograph 14, the stage 20, the directing means 97 and spectral analyser filter 70 as applicable. In typical embodiments, the controller 50 moves the stage 20, and therefore the sample 55, in order to acquire the relevant dataset for the sample. The controller 50 may for example be configured to control the bandpass location and/or spectral range of the spectral analyser 70 to facilitate taking measurements at different wavelengths. Optionally, the controller 50 is configured to control the light source 25 and/or the scanning disk assembly 11, 15. In the illustrated embodiment, there is no need to synchronize the operation of the light source 25 or scanning disk assembly 11, 15 with the other components of the apparatus 100, in particular the spectral analyser 70, spectrograph 14 or optical detector 76, 76', and so there is no need for the controller 50 to control the operation of the light source 25 or scanning disk assembly 11, 15 in this regard. Optionally, however, the controller 50 may be used to turn the control the light source 25 and/or the scanning disk assembly 11, 15 on and off as required. The, or each, controller 50 may take any conventional form, typically comprising a suitably programmed processor, e.g. a microprocessor or microcontroller, and may be connected to the component(s) that it is required to control in any conventional manner.

The invention is not limited to the embodiment(s) described herein but can be amended or modified without departing from the scope of the present invention.

The invention claimed is:

1. A Raman spectroscopy apparatus, the apparatus comprising:
   a spectrograph;
   an imaging optical system configured to transmit light from an object along an optical path to the spectrograph;
   an irradiation optical system comprising a light source and being configured to illuminate said object by directing light from said light source to the object along at least part of said optical path;
   a scanning device comprising a rotatable scanning disk in which a plurality of apertures are formed, the scanning device intersecting said optical path and being rotatable with respect to the optical path,
   wherein said irradiation optical system is configured to direct said light onto said rotatable scanning disk to simultaneously illuminate said object at a plurality of illumination points corresponding to said plurality of apertures,
   and wherein said imaging optical system is configured to transmit Raman scattered light emitted from said object at said illumination points to an intermediate image plane, said scanning device being located at said intermediate image plane and said imaging optical system being configured to transmit Raman scattered light emitted from each of said illumination points through a respective one of said apertures formed in said rotatable scanning disk,
   and wherein said imaging optical system is configured to transmit an array of beams from said intermediate image plane to said spectrograph, each beam comprising Raman scattered light from a respective one of said illumination points and transmitted through said respective one of said apertures,
   and wherein said spectrograph comprises an entrance aperture and is configured to receive said array of beams at said entrance aperture.

2. The apparatus of claim 1, wherein said imaging optical system is configured to focus said Raman scattered light to an input focal plane of said spectrograph.

3. The apparatus of claim 1, wherein said array of beams comprises a linear array of light beams, and wherein said entrance aperture is shaped to define a slit for receiving said linear array of beams, said entrance aperture preferably being located at the input focal plane of the spectrograph.

4. The apparatus of claim 1, wherein said irradiation optical system is configured so that said plurality of illumination points are arranged in a linear array and wherein, preferably, said spectrograph comprises an entrance aperture shaped to define a slit, said imaging optical system being configured to image, or to transmit, light from the linear array of illumination points to said slit.

5. The apparatus of claim 1, wherein said apparatus is configured to take at least one measurement of said scattered Raman light, wherein in each measurement the apparatus detects a plurality of Raman spectra, each Raman spectrum corresponding to a respective one of said illumination points.

6. The apparatus of claim 5, wherein said apparatus is configured to take a plurality of said measurements, wherein in each measurement said Raman spectra correspond to a respective set of illumination points, each set of illumination points corresponding to a different region of said object, each set of illumination points preferably corresponding to a respective linear region of said object.

7. The apparatus of claim 6, wherein said apparatus is configured to scan said object such that said regions collectively cover a target area of said object, and/or wherein said apparatus includes scanning means for effecting relative movement between the object and the region of the object in respect of which each measurement is taken, wherein said scanning means may comprise any one or more of: means for moving said object with respect to said irradiation optical system; a scanning system configured to scan the light from said light source with respect to the object; and/or means for moving an entrance aperture of said spectrograph.

8. The apparatus of claim 1, wherein an optical detector is provided at an exit aperture of the spectrograph, typically at an exit focal plane of the spectrograph.

9. The apparatus of claim 1, wherein the apparatus is configured to perform either one of: Raman spectroscopy in a Raman spectroscopy mode and Raman imaging in a Raman imaging mode, wherein in said Raman imaging mode, the irradiation optical system is configured to illuminate a target area of said object at a plurality of illumination points, and the imaging optical system is configured to capture at least one Raman image of said target area by detecting Raman scattered light from said illumination points in a selected one or more wavelength range, and wherein, optionally, said imaging optical system includes a spectral filter configurable to transmit light only in a selected one or more of a plurality of selectable wavelength ranges, and wherein, in said Raman imaging mode, said spectral filter is located in the optical path to said spectrograph and is configured to transmit light to said spectrograph in said selected one or more wavelength range, and wherein, optionally, said spectral filter is movable into and out of the optical path to said spectrograph, or is configurable to pass light in all of said selectable wavelength ranges simultaneously.

10. The apparatus of claim 9, wherein in said Raman spectroscopy mode said spectrograph is configured to disperse said Raman scattered light by wavelength, and in said Raman imaging mode said spectrograph is configured not to disperse said Raman scattered light by wavelength, said spectrograph preferably being configured to relay a Raman image from said entrance aperture of said spectrograph to an exit of said spectrograph.

11. The apparatus of claim 10, wherein said spectrograph comprises at least one dispersion element, and wherein said at least one dispersion element is movable into and out of a light path between the entrance and exit of the spectrograph, said at least one dispersion element being located in said light path in the Raman spectroscopy mode and out of said light path in the Raman imaging mode, or wherein said at least one dispersion element is configurable between a dispersing state and a non-dispersing state, and wherein, optionally, said spectrograph comprises at least one non-dispersion element movable into and out of the light path, wherein in said Raman imaging mode said at least one non-dispersion element replaces said at least one dispersion element in said light path, and wherein, optionally, said at least one dispersion element and said at least one non-dispersion element are provided on an assembly that is movable between a dispersion state in which said at least one dispersion element is located in the light path, and a non-dispersion state in which said at least one non-dispersion element is located in the light path.

12. The apparatus of claim 1, wherein said imaging optical system includes a spectral filter configurable to transmit light only in a selected one or more of a plurality of selectable wavelength ranges, wherein the spectral filter is located in the optical path before an optical detector, the imaging optical system including directing means for directing said Raman scattered light to the spectrograph and/or to the optical detector, and/or wherein said spectral filter is tuneable, or adjustable, to transmit light only in a selected one or more of a plurality of selectable wavelength ranges, and wherein the directing means optionally comprises a beam splitter, a mirror or any other suitable optical beam switching or beam directing element(s).

13. The apparatus of claim 12, wherein the directing means is movable with respect to the optical path, or is adjustable, such that, in a Raman spectroscopy mode, at least some of the Raman scattered light is directed to the spectrograph, and in the Raman imaging mode at least some of the Raman scattered light is directed to the optical detector.

14. The apparatus of claim 1, wherein said scanning device comprises a plurality of lenses aligned with said plurality of apertures to focus said light on said apertures.

15. The apparatus of claim 14, wherein said plurality of lenses are provided in a rotatable lens disk, the lens disk being rotatable with the scanning disk.

16. The apparatus of claim 1, wherein said light source is a laser light source and is configured to produce a laser beam.

17. The apparatus of claim 1, further including a beam splitter located in the optical path and being transmissive to one of said light source light and said Raman scattered light, and reflective to the other of said light source light and said Raman scattered light, said imaging optical system being configured to image, or to transmit light from, said object along to the optical detector via the beam splitter, and the irradiation optical system being configured to illuminate said object via the beam splitter, and wherein, optionally, said beam splitter is transmissive to said light source light and reflective to said scattered Raman light, and/or wherein the beam splitter is located between the scanning device and the spectrograph.

18. The apparatus of claim 1, wherein said irradiation optical system and said imaging optical system are configured to illuminate and image said object confocally.

19. A Raman spectroscopy method comprising:
transmitting light from an object along an optical path to a spectrograph;
illuminating said object by directing light from a light source to the object along at least part of said optical path;
directing said light onto a scanning device to illuminate said object at a plurality of illumination points simultaneously, wherein said scanning device comprises a rotating scanning disk in which a plurality of apertures are formed, the scanning device intersecting the optical path and rotating with respect to the optical path, and wherein said plurality of illumination points correspond to said plurality of apertures;
transmitting Raman scattered light emitted from said object at said illumination points to an intermediate image plane, said scanning device being located at said intermediate image plane, wherein said transmitting involves transmitting Raman scattered light emitted from each of said illumination points through a respective one of said apertures formed in said rotatable scanning disk;
transmitting an array of beams from said intermediate image plane to said spectrograph, each beam comprising Raman scattered light from a respective one of said illumination points and transmitted through said respective one of said apertures; and
receiving said array of beams at an entrance aperture of said spectrograph.

20. A Raman spectroscopy apparatus, the apparatus comprising:
a spectrograph;
an imaging optical system configured to transmit light from an object along an optical path to the spectrograph;
an irradiation optical system comprising a light source and being configured to illuminate said object by directing light from said light source to the object along at least part of said optical path;

a scanning device comprising a plurality of apertures, the scanning device intersecting said optical path and being movable with respect to the optical path, wherein said irradiation optical system is configured to direct said light onto said scanning device to illuminate said object at a plurality of illumination points, and wherein said imaging optical system is configured to transmit Raman scattered light emitted from said object at said illumination points to an intermediate image plane, said scanning device being located at said intermediate image plane, and to transmit said Raman scattered light from said intermediate image plane to said spectrograph, and wherein the apparatus is configurable to operate in either one of: a Raman spectroscopy mode to perform Raman spectroscopy; and a Raman imaging mode to perform Raman imaging, wherein in said Raman imaging mode the irradiation optical system is configured to illuminate a target area of said object at a plurality of illumination points, and the imaging optical system is configured to capture at least one Raman image of said target area by detecting Raman scattered light from said illumination points in a selected one or more wavelength range, said spectrograph being configured to relay said at least one Raman image from an entrance of said spectrograph to an exit of said spectrograph, said spectrograph being configured not to disperse said Raman scattered light by wavelength, and in said Raman spectroscopy mode said spectrograph is configured to disperse said Raman scattered light by wavelength.

\* \* \* \* \*